United States Patent [19]
Rangan et al.

[11] Patent Number: 6,154,771
[45] Date of Patent: Nov. 28, 2000

[54] REAL-TIME RECEIPT, DECOMPRESSION AND PLAY OF COMPRESSED STREAMING VIDEO/HYPERVIDEO; WITH THUMBNAIL DISPLAY OF PAST SCENES AND WITH REPLAY, HYPERLINKING AND/OR RECORDING PERMISSIVELY INTIATED RETROSPECTIVELY

[75] Inventors: P. Venkat Rangan; Vijnan Shastri; Arya Ashwani; Parag Arole, all of San Diego, Calif.

[73] Assignee: Mediastra, Inc., San Diego, Calif.

[21] Appl. No.: 09/088,513

[22] Filed: Jun. 1, 1998

[51] Int. Cl.[7] .............................. G06F 13/38; G06F 15/17
[52] U.S. Cl. ...................... 709/217; 709/226; 709/229; 709/231; 709/247; 709/305; 345/327; 345/328; 345/335; 345/302; 707/501; 707/513
[58] Field of Search ................................. 345/327, 328, 345/302, 433, 335, 2, 10, 104; 386/109, 52; 709/217, 231, 203, 247, 226, 229, 305; 348/552; 707/501, 502, 513

[56] References Cited

U.S. PATENT DOCUMENTS

| | | | |
|---|---|---|---|
| 5,684,715 | 11/1997 | Palmer | 364/514 |
| 5,760,767 | 6/1998 | Shore et al. | 345/328 |
| 5,801,685 | 9/1998 | Miller et al. | 345/302 |
| 5,809,512 | 9/1998 | Kato | 707/502 |
| 5,850,352 | 12/1998 | Moezzi et al. | 364/514 |
| 5,861,880 | 1/1999 | Shimizu et al. | 345/302 |
| 5,862,260 | 1/1999 | Rhoads | 382/232 |
| 5,893,053 | 4/1999 | Trueblood | 702/187 |
| 5,903,892 | 5/1999 | Hoffert et al. | 707/10 |
| 5,918,012 | 6/1999 | Astiz et al. | 709/217 |
| 5,929,850 | 7/1999 | Broadwin et al. | 345/327 |
| 5,936,679 | 8/1999 | Kasahara et al. | 348/553 |
| 5,961,603 | 10/1999 | Kunkel et al. | 709/229 |
| 5,966,121 | 10/1999 | Hubbell et al. | 345/328 |
| 5,970,473 | 10/1999 | Gerszber et al. | 705/26 |
| 5,974,219 | 10/1999 | Fujita et al. | 386/52 |
| 6,002,401 | 12/1999 | Baker | 345/349 |
| 6,006,241 | 12/1999 | Purnaveja et al. | 707/512 |
| 6,006,265 | 12/1999 | Mishima et al. | 386/11 |
| 6,009,236 | 12/1999 | Mishima et al. | 386/11 |
| 6,025,837 | 2/2000 | Matthew, III et al. | 345/327 |
| 6,025,886 | 2/2000 | Koda | 348/700 |
| 6,026,433 | 2/2000 | D'arlach et al. | 709/217 |
| 6,058,141 | 5/2000 | Barger et al. | 375/240 |
| 6,061,054 | 5/2000 | Jolly | 345/302 |

*Primary Examiner*—Zarni Maung
*Assistant Examiner*—Bunjob Jaroenchonwanit
*Attorney, Agent, or Firm*—Fuess & Davidenas

[57] ABSTRACT

Streaming compressed digital hypervideo received upon a digital communications network is decoded (decompressed) and played in a client-computer-based "video on web VCR" software system. Scene changes, if not previously marked upstream, are automatically detected, and typically twenty-one past scenes are displayed as thumbnail images. Hyperlinks within the main video scene, and/or any thumbnail image, show as hotspots, with text annotations typically appearing upon a cursor "mouse over". All hyperlinks—as are provided and inserted by, inter alia, the upstream network service provider (the "ISP")—may be, and preferably are, full-custom dynamically-resolved to each subscriber/user/viewer ("SUV") upon volitional "click throughs" by the SUV, including retrospectively on past hypervideo scenes as appear within the thumbnail images. Hyperlinking permits (i) retrieving information and commercials, including streaming video/hypervideo, from any of local storage, a network (or Internet) service provider ("ISP"), a network content provider, and/or an advertiser network site, (ii) entering a contest of skill or a lottery of chance, (iii) gambling, (iv) buying (and less often, selling), (v) responding to a survey, and expressing an opinion, and/or (vi) sounding an alert.

23 Claims, 15 Drawing Sheets

User's web page playing hypervideo in VOW!VCR

Click on hotspot invokes a web page

User's web page playing hypervideo in VOW!VCR

Click on hotspot takes user to another video

User's web page playing hypervideo in VOW!VCR

Click on hotspot takes user to a slide show

If 5 Of 6 Regions Do Not Match Between Image (A) And (B)
There Exists A Scene Change

Video Map Structure

```
GOP Start
    {
```

| Shape | Link | Annotation |
|-------|------|------------|
|       |      |            |
|       |      |            |
|       |      |            |

```
    Picture 1
        {   Shape ID

Shape Center Co-Ordinates

Shape Description (Rectangle/Ellepse
            Polygon
        }

Picture 2
        {   Shape ID

Shape Center Co-Ordinates

Shape Description (Rectangle/Ellepse
            Polygon
        }

Picture N
        {   .....

REAL-TIME RECEIPT, DECOMPRESSION AND PLAY OF COMPRESSED STREAMING VIDEO/HYPERVIDEO; WITH THUMBNAIL DISPLAY OF PAST SCENES AND WITH REPLAY, HYPERLINKING AND/OR RECORDING PERMISSIVELY INTIATED RETROSPECTIVELY

RELATION TO RELATED PATENT APPLICATIONS

The present patent application is related to the following U.S. patent application Ser. No. 09/054,362 for HYPERLINK RESOLUTION AT AND BY A SPECIAL NETWORK SERVER IN ORDER TO ENABLE DIVERSE SOPHISTICATED HYPERLINKING UPON A DIGITAL NETWORK, U.S. Pat. No. 6,006,265 issued Dec. 21, 1999. Both related applications are to inventors including the inventors of the present application. Both related applications concern servers upon a digital communications network communicating hypervideo whereas this application concerns a client upon the same network.

Both applications were initially assigned to common assignee Tata America International Corporation, and were later assigned to common assignee HOTV, Inc. The contents of the related patent application are incorporated herein by reference.

BACKGROUND OF THE INVENTION

1. Field of the Invention

The present and related inventions generally concern (i) the machine-automated distribution, processing and network communication of streaming digital video/hypervideo, particularly upon digital networks having network content providers (nominally an "Internet Content Provider", or "ICP"), network service providers (nominally an "Internet Service Provider", or "ISP"), and network client subscribers/users/viewers ("client SUVs"). The present and related inventions also generally concern the provision of diverse sophisticated responses—including branching, storage, playback/replay, subscriber/user-specific responses, and contests—to SUV "click-throughs" on hyperlinks embedded within streaming digital hypervideo.

The present invention itself generally concerns the receipt of, the client subscriber-user-viewer ("client SUV") interaction with, and the machine processing of, streaming digital video and hypervideo.

The present invention particularly concerns receiving (upon digital communications network), decompressing, and playing back interactive video, also known as hypervideo, in real time, including by making manifest to the Subscriber/User/Viewer ("SUV") all available imbedded hypervideo links.

The present invention further particularly concerns following in real time any and all hyperlinks acted upon—normally by "clicking through" with a computer mouse—by the SUV so as to (i) make responses and/or (ii) retrieve further information, which further information may include the receipt, decompression and playing of further streaming digital video, and hypervideo.

The present invention still further particularly concerns (i) caching of digital video and hypervideo including hyperlinks, (ii) detecting scene changes, (iii) generating scene "keyframes", or thumbnail images, (iv) displaying detected scene changes, and (v) retrospectively initiating the recording of, and/or initiating, potentially retrospectively, (vi) the playing back of, and/or (vii) hyperlinking from, and/or (viii) recording of, digital video/hypervideo, either from a current playback position or from the start of any stored scene.

The present invention still further particularly concerns recording and archiving streaming digital video and hypervideo.

2. Description of the Prior Art 2.1. Introduction to the Theory of Hypervideo

There is no requirement to read the present section 2.1—which section is based on the early investigations and research into hypervideo of Sawhney, et al., as transpired at MIT (reference cited below)—in order to understand the function, and, at a crude level, the purpose(s) of the present invention. However, hypervideo is, as of the present time (1998) very new, and few people have experienced it. The present section may accordingly beneficially be read in order to gain a "feel" for hypervideo.

More fundamentally, the present section discusses the considerable power of hypervideo, and ends with a discussion of the empowerment that hypervideo provides to a subscriber/user/viewer. The present and related inventions, although they can be narrowly thought of as mere systems and methods for delivering lowly commercials in the hypervideo environment, are really totally consistent with the more profound, and the more ennobling, purposes of hypervideo. Therefore the present section may also beneficially be read to understand to what purposes—both good and ill—hypervideo may be put, and as background to how the present and related inventions serve these purposes.

In recent years Sawhney, et al., at MIT (reference cited below) have developed an experimental hypermedia prototype called "HyperCafe" as an illustration of a general hypervideo system. This program places the user in a virtual cafe, composed primarily of digital video clips of actors involved in fictional conversations in the cafe; HyperCafe allows the user to follow different conversations, and offers dynamic opportunities of interaction via temporal, spatio-temporal and textual links to present alternative narratives. Textual elements are also present in the form of explanatory text, contradictory subtitles, and intruding narratives. Based on their work with HyperCafe, Sawhney, et al. have been leaders in discussing the necessary components and a framework for hypervideo structures, along with the underlying aesthetic considerations. The following discussion is drawn entirely from their work.

"Hypervideo" can be defined as "digital video and hypertext, offering to its user and author the richness of multiple narratives, even multiple means of structuring narrative (or non-narrative), combining digital video with a polyvocal, linked text." Hypervideo brings the hypertext link to digital video. See Sawhney, Nitin, David Balcom, Ian Smith "HyperCafe: Narrative and Aesthetic Properties of Hypervideo." Proceedings of the Seventh ACM Conference on Hypertext. New York: Association of Computing Machinery, 1996.

An even earlier approach to hypermedia was proposed by George Landow, in which he offered rules for hypermedia authors, rules that took into account hypermedia's derivation from print media and technologies of writing. Landow proposed that hypermedia "authors" learn which aspects of writing applied to the emerging hypermedium, and which traits or characteristics needed redefinition and rethinking. He noted: "To communicate effectively, hypermedia authors must make use of a range of techniques, suited to their medium, that will enable the reader to process the information presented by this new technology." See Landow, George P. "The Rhetoric of Hypermedia: Some Rules for Authors." Journal of Computing in Higher Education, 1 (1989), pp. 39–64; reprinted in Hypermedia and Literary Studies, ed. by Paul Delany and George P. Landow, Cambridge, Mass.: MIT Press, 1991.

Hypervideo has its roots in both hypertext and film. As a result, hypervideo embodies properties of each field, but wholly can be placed in neither, for hypervideo is not strictly linear motion picture, nor is it strictly hypertext. This convergence known as hypervideo comments on each discipline, on their similarities, and on their differences. Hypervideo is potentially nonlinear, like hypertext, but displays moving images, like film. Hypervideo can signify through montage, like film, and can generate multiple dictions, like hypertext. Properties of each medium are present in hypervideo. These properties take on new forms and practices in hypervideo.

Hypervideo relocates narrative film and video from a linear, fixed environment to one of multivocality; narrative sequences (video clips followed by other video clips) need not subscribe to linearity. Instead of creating a passive viewing subject, hypervideo asks its user to be an agent actively involved in creation of text through choice and interaction. Hypervideo can potentially change viewing subject from a passive consumer of the text to an active agent who participates in the text, and indeed, is engaged in constructing the text.

Just as hypertext necessitated a re-reading of the act of reading and writing, hypervideo asks for a re-viewing of narrative film and film making and practices of viewing a film. Hypervideo redefines the viewing subject by breaking the frame of the passive screen. Hypervideo users are participants in the creation of text, as hypertext readers are.

Research is presently (circa 1997) projected to determine just how users of hypervideo systems navigate, interact with, and experience hypervideo-texts. Just as J. Yellowlees Douglas has exhaustively researched hypertext readers and the act of hypertext reading, similar projects are expected to be undertaken by hypervideo researchers. See Douglas, J. Yellowlees. "Understanding the Act of Reading: the WOE Beginner's Guide to Dissection." Writing on the Edge, 2.2. University of California at Davis, Spring 1991, pp. 112–125. See also Douglas, J. Yellowlees. "'How Do I Stop This Thing?': Closure and Indeterminacy in Interactive Narratives." Hyper/Text/Theory, ed. by George P. Landow. Baltimore: The Johns Hopkins University Press, 1994.

Hypervideo is related to film. Hypervideo has the potential to reveal important associations present in a film, and the constructedness of linear filmic narratives, and to this end, would be a beneficial tool for use with film studies education and research. Hypervideo can make available, by way of link opportunities, the different associations and allusions present in a filmic work. These associations are made manifest with hypervideo, made available for the student (or teacher) to see and explore. Relationships between different films can then be tracked, linked, commented on, revealed.

Hypervideo engages the same idea of "processing" that hypertext writing does: in writing hypertext, one makes available the process of writing, representing it visually (in the form of the web the writer builds), rhetorically (in the linking structure of the work, the points of arrival and departure present in the text)—and so one makes apparent the tensions and lines of force present in the act of writing, and the creation or reification of narrative. "Writing" hypervideo does the same for image-making—that is, makes clear the notion of constructing images and narrative. In the case of hypervideo, "narrative" refers to narrative film making. Just as hypertext has within it the potential to reveal the constructedness of linear writing, and to challenge that structure, hypervideo does the same for narrative film making—while also offering the possibilities for creating rich hypervideo texts, or videotexts.

How does narrative film function in hypervideo? Narrative film is necessarily re-contextualized as part of a network of visual elements, rather than a stand-alone filmic device. Because narrative segments can be encountered out of sequence and (original) context, even strictly linear video clips are given nonlinear properties.

Sergei Eisenstein pioneered the concept and use of montage in film. Hypervideo reveals and foregrounds this use. Eisenstein proposed that a juxtaposition of disparate images through editing formed an idea in the viewer's head. It was Eisenstein's belief that an idea-image, or thesis, when juxtaposed through editing, with another, disparate image, or antithesis, produced a synthesis in the viewing subject's mind. In other words, synthesis existed not on film as idea-image, but was a literal product of images to form a separate image-idea that existing solely for the viewer.

Eisenstein deliberately opposed himself to continuity editing, seeking out and exploiting what Hollywood could call "discontinuities." He staged, shot, and cut his films for the maximum collision from shot to shot, sequence to sequence, since he believed that only through being force to synthesize such conflicts does the viewer participate in a dialectical process. Eisenstein sought to make the collisions and conflicts not only perceptual but also emotional and intellectual." See Bordwell, David and Kristin Thompson. Film Art: An Introduction. Fourth Edition. New York: McGraw-Hill, Inc., 1993.

Hypervideo potentially reveals this thesis/antithesis dialectic, by allowing the user to choose an image-idea (in this case, a video clip), and juxtaposing it with another image-idea (another video clip). Hypervideo allows the user to act on discontinuities and collisions, to engage with colliding subtexts and threads.

The user selects a video clip from a black canvas of three or four clips. Each clip lies motionless on the canvas. The user drags a clip onto another one, and they both start to play. Voices emerge and collide, and once-separate image-ideas now play concurrently, with one image extending the frame of the other. The user is left to determine the relationship between the two (or three or four) video clips.

Such video intersections recall Jim Rosenberg's notion of simultaneities, or the "literal layering on top of one another of language elements." See Rosenberg, Jim. "Navigating Nowhere/Hypertex Infrawhere." ECHT 94, ACM SIGLINK Newsletter. December 1994, pp. 6–19. Instead of language elements, video intersections represent the layering of visual elements, or more specifically, visual elements in motion. This is not to say that words, in the case of Rosenberg's Intergrams, are not visual elements; on the contrary, they are. In fact, their image-ness is conveyed with much more clarity (and even urgency) than are non-simultaneous words, or words without an apparent visual significance (save the "transparent" practice of seeing "through" letter-images into words into sentences into concepts). Once the word-images have to contend with their neighbor-layers for foreground screen space, their role in both the practice of signification (where meaning is contingent on what neighborly 0's and 1's are NOT), and as elements of a user interface (words that yield to the touch or click or wave of the mouse) become immediate and obvious. Nor is this to say that video clips aren't "language elements"; on the contrary, they are. The hypervideo clip is caught, as are words and letters, in the act of signification and relational meaning-making ( . . . what neighborly 0's and 1's are not . . . ), mutable to the very touch of user, to the layers above and below.

The hypervideo author can structure these video intersections in such a way that only X and Y clips can be seen together, or X and Z if Y has already been seen (like Storyspace's guard fields), and so on, and the author can decide if a third video should appear upon the juxtaposition of X and Y. For example, Video X is dragged onto Video Y and they both start to play. The author can make a choice to then show video Z as a product, or synthesis, of the juxtaposition of Videos X and Y, that reflects or reveals the relationship between Videos X and Y. This literal revealing of Eisenstein's synthesis is made possible with hypervideo. Of course, no synthesis need be literally revealed; that can be left up to the viewer. While the interactions are structured by the hypervideo author or authors (as Eisenstein structured the placement and editing of thesis and antithesis idea-images), the meaning-making is left up to the hypervideo user. His or her choice reveals meaning to him with each video intersection; meaning in the system is neither fixed nor pre-determined. This empowering principle of hypertext is also a property of hypervideo.

2.2. MPEG Standards 2.2.1. Overview

The present invention will be seen to involve computer systems and computer processes dealing with compressed video, and hypervideo, digital data. The video digital data compression may be accomplished in accordance with many known techniques and standards, and is only optionally in accordance with the MPEG family of standards. One short part of the explanation of the invention within this specification will show the operation of the system of the invention in the recording of video that is, by way of example, MPEG-compressed. Accordingly, some slight background as to the MPEG standard is useful, and is provided in this and the following three sections.

The Motion Picture Experts Group—MPEG—is a joint committee of the International Organization for Standardization (ISO) and the International Electrotechnical Commission (IEG). The first MPEG Standard, known as MPEG-1, was introduced by this committee in 1991. Both video and audio standards were set, with the video standard built around the Standard Image Format (SIF) of 352×240 at 30 frame per second. MPEG data rates are variable, although MPEG-1 was designed to provide VHS video quality at a data rate of 1.2 megabits per second, or 150 KB/sec.

The MPEG-2 standard, adopted in the Spring of 1994, is a broadcast standard specifying 720×480 playback at 60 fields per second at data rates ranging from 500 KB/sec to over 2 Megabytes (MB) per second.

The expanded name of the MPEG-1 standard is "Coding of Moving Pictures and Associated Audio for Digital Storage Media". The standard covers compression of moving pictures and synchronized audio signals for storage on, and real-time delivery from, CD-ROM.

The sponsoring body is ISO/IEC JTC1/SC29 WG11 (also know as the Moving Pictures Expert Group). The standard is set forth in ISO/IEC 11172:1993 Information technology—Coding of moving pictures and associated audio for digital storage media up to about 1.5 Mbit/s.

Characteristics and description of the MPEG-1 standard is as follows. A typical interlaced (PAL) TV image has 576 by 720 pixels of picture information, a picture speed of 25 frames per second and requires data to be delivered at around 140 Mbit/s. Computer systems typically use even higher quality images, up to 640 by 800 pixels, each with up to 24 bits of color information, and so require up to 12 Mbits per frame, or over 300 Mbit/s. CDs, and other optical storage devices, can only be guaranteed to deliver data at speeds of around 1.5 Mbit/s so high compression ratios are required to store full screen moving images on optical devices.

The MPEG-1 standard is intended to allow data from non-interlaced video formats having approximately 288 by 352 pixels and picture rates of between 24 and 30 Hz to be displayed directly from a CD-ROM or similar optical storage device, or from magnetic storage medium, including tape. It is designed to provide a digital equivalent of the popular VHS video tape recording format.

High compression rates are not achievable using standard, intraframe, compression algorithms. MPEG-1 utilizes block-based motion compensation techniques to provide interframe compression. This involves the use of three types of frame encoding: 1) intra coded I-Pictures are coded without reference to other pictures; 2) predictive coded P-Pictures are coded using motion compensation prediction based on preceding I-Pictures or P-Pictures; and 3) bidirectionally-predictive coded B-Pictures use both past and future I-Pictures and B-Pictures as their reference points for motion compensation.

While B-Pictures provide the highest level of compression they cannot be interpreted until the next I-Picture or P-Picture has been processed to provide the required reference points. This means that frame buffering is required for intermediate B-Pictures. The amount of frame buffering likely to be available at the receiver, the speed at which the intermediate frames can be processed, and the degree of motion within the picture therefore control the level of compression that can be achieved.

MPEG-1 uses a block-based discrete coding transform (DCT) method with visually weighted quantification and run length encoding for video compression. MPEG-1 audio signals can be encoded in single channel, dual channel (two independent signals), stereo or joint stereo formats using pulse code modulation (PCM) signals sampled at 32, 44.1 or 48 kHz. A psychoacoustic model is used to control audio signals sent for quantification and coding.

2.2.2. How MPEG Works

Like most video compression schemes, MPEG uses both interframe and intraframe compression to achieve its target data rate. Interframe compression is compression achieved between frames, through, essentially, eliminating redundant interframe information. The classic case is the "talking head" shot such as with a news anchor, where the background remains stable and movement primarily relates to minor face and shoulder movements. Interframe compression techniques store the background information once, and then retain only the data required to describe the minor changes—facial movements, for example—occurring between the frames.

Intraframe compression is compression achieved by eliminating redundant information from within a frame, without reference to other video frames. MPEG uses the Discrete Cosign Transform algorithm, or DCT, as its intraframe compression engine. By and large, however, most of MPEG's power come from interframe, rather than intraframe compression.

MPEG uses three kinds of frames during the compression process: 1) Intra, or I frames; 2) Predicted, or P frames; and 3) Bi-directional interpolated, or B frames. Most MPEG encoding schemes use a twelve- to fifteen-frame sequence called a group of pictures, or GOP.

I frames start every GOP, and serve as a reference for the first two B frames and first P frame. Since the quality of the entire GOP depends upon the quality of its initial I frame, compression is usually very limited in the I frame.

P frames refer back to the immediately preceding P or I frame, whichever is closer. For example, P frame 4 could refer back to I frame 1, and P frame 7 referring back to frame 4. During the encoding process, frame 4 searches frame 1 for redundancies, where the data about which are essentially discarded. Regions in frame 4 that have changed since frame 1—called "change regions"—are compressed using MPEG's intraframe compression engine, DCT. This combination of interframe and intraframe compression typically generates a higher degree of compression than that achieved with I frames.

MPEG uses yet another compression strategy: B frames refer backwards and forwards to the immediately preceding or succeeding P or I frame. For example, for frame 11, a B frame, the compression scheme would search for redundant information in P frame 10 and the next I frame; once again, redundant information is discarded and change regions are compressed using DCT. The double-dose of interframe compression typically generates the highest compression of the three frame types.

All three types of encoders use the same basic GOP scheme defined in the MPEG specification. From a pure compression standpoint, the schemes differ in two key ways: their relative ability to identify interframe redundancies and whether they can modify GOP placement and order to maximize compressed video quality.

2.3 Practical Problems With Hypervideo

The concept is clear that, once hyperlinks can be inserted into streaming digital video (as they efficiently are by the related inventions) so as to make hypervideo, then a Subscriber/User/Viewer ("SUV") of the streaming digital hypervideo can, by volitionally exercising the hyperlinks—normally by "clicking through" on a link with a computer mouse—control, to some extent, the progress of (streaming digital hypervideo) viewing. However, a great number of questions and problems are immediately presented.

How long should the hyperlinks "last", meaning that they are susceptible of being acted upon? If the hyperlinks persist for a long time, or indefinitely, then they will likely offer insufficiently flexible, and diverse, branching capability in video presentations that are, as is common, fast-moving and diverse. Consider, for example, a newscast where, within only a few seconds or tens of seconds devoted to a single story, the SUV might beneficially be offered the capability to "click through" to diverse further information (ranging from commercials to education). If, however, the hyperlinks are as transitory as the accompanying (hyper)video, the SUV would have to have to make up his or her mind with astounding rapidity, and then "pounce like a cat" in order to reasonably "click through" on hyperlinks of interest. The present invention will shortly be seen to deal with this dilemma by holding past hyperlinks available, in the full context of their initial presentation, for a generously long time. It will be possible, for example, to exercise hyperlinks associated with (hyper)video scenes that have already previously gone by some minutes ago.

Next, what should happen upon a SUV "clicking through" on a hyperlink? Should The SUV'S computer be branched to a new, linked, (hyper)video "feed", only? If so, then how can the SUV return to where he/she left off, or even—a momentary diversion having been exercised—to the "present" progress (whatever the word "present" means in hyperspace, and it doesn't mean much) of the (hyper)video "feed" that the SUV previously left off from? Or, alternatively, should a parallel separate screen—equivalent to the present capability of networked computers to institute multiple running copies of a network browser be instituted? And if so, then how many times does this go on? Until computer memory no longer permits (as is the case with internet browsers)? Or until the video bandwidth is so fragmented that not all, or even no, "screens" update smoothly and properly?

The present invention will shortly be seen to permit the SUV to keep visible two simultaneous (hyper)video feeds—differently displayed—not primarily because of hardware limitations, but mostly because the "richness" of hypervideo (as compared to, for example, the linear linking of URL's with an internet browser) is likely to cause the SUV to "overload", and become confused as to where and when he/she is in viewing when indefinitely many scenes and options are simultaneously presented.

Next, what, if any, features—other than such simple branching as is analogous to branching between web sites with an internet network browser—should be accorded a SUV for "clicking through" on a hyperlink.

The present invention will shortly be seen to contemplate, and to fully enable, amazingly diverse, and versatile, responses to a SUV click on an appropriate hyperlink. If the SUV simply wants to see or hear something on the network, or somewhere in cyberspace, then "clicking through" on a hyperlink may be considered a "natural" response. However, suppose the SUV wants to make/register a response—anything from providing the simplest feedback by clicking a mouse button to selectively moving the cursor and clicking the mouse button to answer the hardest question to typing a response—for any of diverse purposes ranging from (i) a simple request for printed/mailed/e-mailed information to (ii) the ordering of goods to (iii) the entry of contests and lotteries?

It will shortly be seen that, in accordance with the present invention, each separate SUV (of potential thousands, and tens of thousands under a single Internet Service Provider, or ISP) will enjoy (i) unique hyperlinks (ii) uniquely resolved (called "dynamic hyperlink resolution"). In short, the hyperlinks offered each SUV are absolutely anything that the offeror—normally (i) an advertiser or (ii) a service agency or (iii) a network store or (iv) a contest administrator variously located (in accordance with the related invention) at many points along a long network path to the user—says that they are! If some entity gives an SUV a hyperlink to click upon to (i) see a car or (ii) receive information on a car or (iii) buy a car or (iv) win a car, then the SUV need only exercise the hyperlink to (i) see, (ii) learn about, (iii) buy, or (iv) win, the car.

SUMMARY OF THE INVENTION

The present invention contemplates a system and a method for a real-time, seamless, (i) receipt at a client subscriber/user/view ("SUV") of streaming digital hypervideo served upon a digital communications network by one or more network servers, and (ii) provision of diverse responses, including but not limited to hyperlinking, to the received hypervideo at the client SUV.

The received digital hypervideo is decoded/decompressed, and played (alternatively, "displayed") and/ or, optionally, recorded, in real time. Hyperlinks, as are visible on the scene display as "hotspots" at the volition of the subscriber/user/viewer ["SUV"], may volitionally be followed (whether visible or not) by the SUV receiving the hypervideo upon the network by, normally, the simple expedient of pointing and clicking on a "hotspot" with a computer mouse. Howsoever many hyperlinks and links are followed by the SUV for howsoever long duration, the SUV may return to (hypervideo) viewing exactly (at least for, typically, some hours or days elapsed time) where he/she left off.

Scene changes within the streaming hypervideo are automatically detected, and representative scenes from the hypervideo stream are separately temporarily statically displayed in thumbnail, or keyframe, form as a history file. By point-and-click reference to these historical thumbnail scene images, the SUV may initiate on demand the retrospective replay of past hypervideo, or the retrospective recording of the past hypervideo, or even the retrospective following of hyperlinks within the past hypervideo. As before, no matter when and where the SUV exercises a hyperlink in order to branch within the stream of hypervideo, and no matter to which or to how many different locations and resources (both remote upon the network, and local) the SUV may branch to, and no matter how long (within limits) the SUV may spend away from the original, core, hypervideo stream, the SUV may resume (hypervideo) viewing at the interrupted spot—even if this spot retrospective to hypervideo already viewed.

The summary effect is that, so far appears to each separate SUV, each SUV is totally in charge of every aspect of his/her (hypervideo) viewing, recording and replay experience, and he or she can go when and where he or she wants for so often as he or she wants for so long as he or she wants. In actual operation, most streaming digital hypervideo streams upon the network are efficiently multicast (from one hypervideo network server to multiple SUVs in common), the local computers of each SUV serving to buffer some of the (streaming digital hypervideo) information by which, due to SUV-initiated events such as hyperlinking or even a simple common "pause", the display at a particular SUV may come to "lag" real time multi-cast hypervideo on the network. Equally importantly, the network servers can serve (re-serve) hypervideo on demand to SUVs who have spent interrupted hours, instead of mere minutes, away from (the streaming, multicast flow, of) hypervideo viewing.

1. Summary Function, and Operation

The present invention contemplates a system and a method for the real-time, seamless, (i) receipt of, (ii) decoding of, (iii) playback of, (iv) following of hyperlinks within, (v) detection of scene changes in, (vi) display of detected scene changes as keyframes (or thumbnail images) in, and (viii) recording of, streaming digital hypervideo received upon a digital communications network, and the (ix) playback of the hypervideo so recorded.

These functions are not merely directed to realizing hypervideo by acting upon hyperlinks embedded in streaming digital hypervideo, but to beneficially making both hyperlinks and hyperlinking (i) intuitive, (ii) easy to see, (iii) easy to understand, and (iv) mentally and physically easy to exercise, by the Subscriber/User/Viewer (SUV) of the hypervideo.

The hyperlinking on hyperlinks within the present invention is, in particular, realized by simply (i) pointing and clicking on (ii) highlighted scene "hotspots" that are individually associated with hyperlinks. The SUV may select that the hotspots should, or should not, be shown within the ever-dynamically-evolving streaming main video. (Even when hotspots are not shown, clicking where a hotspot is—which location(s) may often be imputed by the viewer—will result in hyperlinking.) The same hotspots will normally also be shown within historic static thumbnail scenes that are maintained to view even after the streaming video from which these scenes, hotspots and associated hyperlinks have been extracted has passed. Nonetheless to the simplicity of exercise, very sophisticated occurrences can arise upon clicking on hyperlinks, including most notably the ability to, after viewing or otherwise interacting with hyperlinked information, return to the regular (streaming) video-hypervideo viewing exactly where previously left off from. If, as is often the case, the hyperlinks lead to commercial messages, the SUV need not, and will not, feel that any substantive (hypervideo) viewing experience is sacrificed because of lingering on, interacting with, or simply more fully exploring a commercial message.

In accordance that the historical video thumbnails with their associated hotspots (which are in turn associated with hyperlinks) are statically displayed, the SUV is given more than adequate time to think about, and to respond to, the potential for video hyperlinking. The SUV exercises a hyperlink (iii) by volitionally selecting a hotspot (a graphics, or, more rarely, a text, overlay to a scene picture element) that is generally both visually unambiguous and readily comprehensible (iv) by the simple act of pointing and clicking on the hotspot. According to the fact that the hotspots are both clearly and, in the thumbnail, statically displayed, even small children are able to comprehend the potential benefits of hyperlinking, and to actually hyperlink, with great success. Although generally useful to account for normal delays in human decision making, this ability to respond to past hyperlinks is particularly useful for hyperlinking commercial messages where it may take some time for the impact, inducement or even the presence, of the message to "sink in". Coupled with the capability of the invention to return a SUV to any (reasonable) point desired in his or her personal viewing experience, the SUV may indulge himself or herself to follow all hyperlinks, including those to commercials, whensoever desired for so long as is desired (within reason) to, ultimately, any network place or resource that is desired.

The present invention further contemplates (vii) the retrospective recording of the streaming digital hypervideo received upon a digital communications network. In other words, once copious (hyper)video streams have been, in accordance with the present and related inventions, easily obtained, the SUV is given a powerful, semi-automated, tool to work with the obtained (hyper)video. This tool is in all respects analogous to a video tape recorder, or VCR, and is commonly called a "video on web video tape recorder", or a "VOW™ VCR", or, alternatively, a "HOTV™ VCR". (Both VOW™ VCR" and "HOTV™ are trademarks of Tata America International Corporation, assignee of the present invention.)

The recording of (steaming) digital video/hypervideo within the present invention is, in particular, realized by simply selecting and activating screen control "buttons", in the manner of the controls of a conventional Video Cassette Recorder (VCR). Nonetheless to the simplicity of this control, sophisticated occurrences can arise, including the abilities (i) to "store" video/hypervideo both locally and at a remote server of video/hypervideo, (ii) to play back stored hypervideo interactively with current real-time streaming video/hypervideo, and (iii) to follow hyperlinks within stored hypervideo upon playback even if, after the lapse of some months or years, the resource(s) located at the ultimately-accessed hyperlinked network location(s) has (have) changed, or even when these locations have disappeared from the network (thus circumventing the "broken link" problem).

The present invention still further contemplates, interactively with compatible software and network functions offered by a server of the hypervideo, that (viii) the SUV can derive certain benefits from clicking through on appropriate hyperlinks. The most common benefit is information—whether of a commercial nature or otherwise—that may be (and commonly is) immediately provided (i.e., as a hyperlinked (hyper)video stream) or that may be provided at other places and/or at other times (e.g., by e-mail, or by mail).

Moreover, diverse additional "benefits" other than simple information can be realized (commensurate with the user-specific individual hyperlinks). A user may (i) enter a contest of skill or a lottery of chance, (ii) gamble to win or to lose, (iii) engage in e-commerce by buying (or, less often, selling), (iv) respond to a survey, and express an opinion, and/or (v) sound an alert—all simply by clicking on an appropriate hyperlink. Clearly the (hypervideo) viewing experience encompasses many activities presently associated with the Internet, and more.

2. Context of the Present Invention Within Related Inventions, and Within a Complete System for Enabling Hypervideo on Digital Communications Networks A first and a second related invention to the present invention respectively concern (i) making and (ii) distributing hypervideo. Hypervideo is (i) made from (a) video and (b) hyperlinks by software-based editing processes. Such a hypervideo editor is taught in the related patent application for HYPERVIDEO AUTHORING AND EDITING BY DRAGGING AND DROPPING DIVERSE HYPERLINKS INTO AUTOMATICALLY-DETECTED SCENE HOTSPOTS, WITH SCENES' DURATIONS BEING FURTHER AUTOMATICALLY DETECTED.

Perhaps more interestingly, these processes may be automated or semi-automated, so as to efficiently seamlessly insert hyperlinks into video, including in real time while the video remains compressed. Hypervideo may thus be both (i) made and (ii) distributed in real time, for example in the form of a hyperlink-annotated live video newscast. The insertion of video and hypervideo clips and hyperlinks in streaming digital video/hypervideo is taught within the related patent application for REAL-TIME TARGETED INSERTION OF VIDEO CLIPS, HYPERVIDEO CLIPS AND/OR HYPERLINKS IN COMPRESSED STREAMING VIDEO, INCLUDING DYNAMICALLY AT MULTIPLE POINTS BETWEEN CONTENT PROVIDERS AND SUBSCRIBERS IN DIGITAL NETWORKS. This hyperlink insertion is normally done at any of a network content provider, or Internet Content Provider (an "ICP"), an Internet Service Provider (an "ISP"), and/or a Local Network Affiliate (a "LNA"). The video with inserted hyperlinks, ergo hypervideo, is variously received (by means ranging from a transported disk to network communication) at a network video server, and is ultimately served on demand to each client subscriber/user/viewer ("SUV") upon a digital communications network by this video server.

The inserted hyperlinks will ultimately, in accordance with the present invention, serve to access still further, other, digital (hyper)video clips, particularly commercials. This accessing may be direct, and in accordance with a Universal Resource Locator ""URL") contained within the hyperlink. However, the accessing is preferably, in accordance with the related invention for HYPERLINK RESOLUTION AT AND BY A SPECIAL NETWORK SERVER IN ORDER TO ENABLE DIVERSE SOPHISTICATED HYPERLINKING UPON A DIGITAL NETWORK STREAMING DIGITAL HYPERVIDEO FROM A NETWORK HYPERVIDEO SERVER TO NETWORK CLIENTS; INCLUDING FOR PROVIDING FULLY CUSTOMIZED HYPERLINKS, SECURITY, AND/OR CONTESTS AND LOTTERIES TO THE CLIENTS BOTH COLLECTIVELY AND SEPARATELY, indirect. The "indirect access" is realized by hyperlinking first the special network server, and then, usually, to a URL provided by that server.

The present invention operates within the personal computer system, within the digital television, or within a television enhanced by a set-top box, of a client subscriber-user-viewer. So operating it is compatible with the larger system. Namely, it receives streaming digital hypervideo upon the digital communications network, and displays the received hypervideo and its embedded "hotspots" (which are visual manifestations of the hyperlinks). This is happening, of course, at each of potentially thousands of client subscribers/users/viewers (client SUVs) at the same time.

Selective volitional exercise of any inserted hyperlink(s)—the existence of which hyperlink(s) is (are) made visually manifest to the SUV as hotspots on the video imagery—by the client SUV is typically by action of the SUV to "point and click" with a computer mouse, a so-called "click through". A click-through on an embedded hyperlink by the client SUV sets in motion that part of the present invention—a software-based process—that is compatible with another software-based process present upon the special network server. (This special server may, however, have other roles such as being a, or the, network/Internet content provider (ICP), video server, or network service provider/internet service provider (ISP).)

The present invention thus cooperates with the special server in the custom management of streaming digital video/hypervideo for each single one of potentially thousands and tens of thousands of subscribers/users/viewers (SUVs) upon a digital network communicating, inter alia, hypervideo. Each and every client SUV may receive any of (i) video/hypervideo content, (ii) hyperlinks, (iii) services, such as record/storage and playback/replay, (iv) controlled access to information (such as is commonly used to restrict viewing by children), and/or (v) contest results, in accordance with his, her or their unique (network) identity.

In functioning to select, or hyperlink, among plural streams of digital hypervideo in responsive to, at least partially, the unique choices of an individual SUV, the computer program of the present invention operating at the network-connected "computer" of the SUV is interactive with a compatible program operating at the special server (which server may, however, also be an ICP, an ISP or a LNA).

The computer program of the present invention which is resident at the client SUV, and complimentary to a program within the special server, is called a "Video On Web Video Cassette Recorder", or "Video on Web VCR", or just simply "VOW VCR". (This client program is also called a "HOTV™ Client" where HOTV™ is a trademark of Tata America International Corporation, assignee of the present invention; although this term will not generally be used within this specification.)

Similarly, the special server is called a "Video On Web Server", or "VOW™ Server". (It is also, alternatively, called a "HOTV™ Server", where VOW™ and HOTV™ are trademarks of Tata America International Corporation, assignee of the present invention. All usage of these terms within this specification is in reference to generic severs and generic SUV "VCR's" in accordance with the present invention.)

At first presentation, the names "Video On Web Server", or "VOW Server" may be slightly confusing: the server does not particularly, primarily, or uniquely serve (hyper)video on the digital network, or web. Instead, it enables hypervideo on the digital network, or web, as explained in the companion patent application. To say again, the VOW Server is not normally a server of streaming digital video, or hypervideo—which instead normally comes from video servers that may be associated with any of content providers, network service providers, and/or third-party network sites such as advertisers. The VOW Server instead enables the distribution and the progression, and the custom distribution and progression, of (hyper)video to, and at, all the network client SUVs.

In simplistic terms, the related inventions may be considered to concern (i) how to make fully group or community-customized and time-customized hypervideo, normally at an ICP/ISP/LNA, and (ii) how the SUVs' exercise(s) of hyperlinks are accorded, at the special server (which may be the ICP/ISP/LNA), a fully customized interpretation, while the present invention concerns (iii) how each SUV, or client, may sense and may exercise hyperlinks within streaming digital hypervideo.

Accordingly, the related disclosures and this disclosure may beneficially be read together.

3. The (Software) System of the Invention

The system of the present invention is a software system, and is present in a network-connected computer—a "client"—of a Subscriber/User/Viewer ("SUV") upon a digital communications network that communicates streaming digital video/hypervideo. Accordingly, the present invention is implemented as a network-based, or web-based, playback and record client. It is used in conjunction with a network, or web, server of hypervideo, meaning streaming digital video in which hyperlinks are embedded. The streaming hypervideo preferably also contains (i) pre-determined scene change points with (ii) associated text annotations for those scenes, plus (iii) security information, all as is explained in the companion patent applications.

In one of its aspects the present invention may thus be considered to embodied in a (digital) video tape recorder, or VCR, used in network communications, and may thus be called a "video-on-web" VCR, or "VOW VCR" or, alternatively, a "HOTV™ VCR". (VOW™ VCR" and "HOTV™ are trademarks of Tata America International Corporation, assignee of the present invention.) The objectives of the VOW VCR are as follows.

First, it acts as a web-based playback client through which a SUV can select channels, just as the SUV might with a normal TV, so as to play back hypervideos or just plain videos. In so doing the video-on-web VCR presents the usual VCR-like controls for video play back including fast-forward, pause, rewind and fast-reverse. The SUV uses a simple cursor to control the playing of stored videos, whereas for live videos clicking on a simple play-and-pause control suffices.

Second, when playing hypervideos the video-on-web VCR displays a text annotation about the object when the SUV does a mouse-over on the object. These annotations can beneficially serve to impart additional, supplemental, information about the scene and/or the objects in it, such as, for example, the identity of a particular person in a depicted group of persons. More commonly, however, the annotation is, or includes, a Universal Resource Locator, or URL. If the SUV clicks on an object having a URL annotation then the video-on-web VCR (the "VOW VCR") will jump to another video or web page or image.

Third, the SUV can click on a record button, and can then record the video starting at the current frame locally on his hard disk or other media provided that security privileges allow him or her to do so.

Notably, in so performing the VOW VCR will display thumbnail images of scenes which have been defined and delineated at the server. See the companion patent application. In the case of "canned" video, these scene changes may well have been manually detected, and the scene change boundary markers long since inserted by an editor sitting at a console so as to annotate the video not in real time. In the case of "live" video as is typical of, inter alia, news broadcasts, the scene change boundaries are automatically detected at the video server, and the associated hyperlinks (if any, and which may be sparse in number) inserted much in the contemporaneous manner of a court reporter, or of a translator. The inserted hyperlinks may be less numerous, less well focused, less wide-ranging, and/or less versatile in a live video feed. For example, consider a newscast, and particularly the newscast sports segment. A (network) broadcast "station" employee at a computer station has readily to hand certain hyperlinks to baseball, football, basketball and hockey—if only to the league web sites where the team scores are posted. As the sports commentary and/or sports scores unfold in the live videocast, minor link insertions by this employee serve to "hyperlink annotate" this portion of the news.

At any time about twenty most recent such thumb-nail images, representing twenty most recent scenes will displayed. When a new scene is detected it enters the lowest corner while the oldest scene is discarded in a first-in, first-out (FIFO) fashion. The video corresponding to these twenty scenes is also buffered in FIFO fashion on local storage. The user can click on any of the scenes to start recording from that scene. The implication of this is that the user can record video which has gone by such as a sports action shot or a talk-show quote.

The VOW VCR is preferably implemented within the Microsoft DirectX filter graph architecture. The scene change detection and recording modules are implemented as filters. The handling of clicks on hotspots, or hyperlinks, in hypervideo is so that when SUV clicks on a hotspot then the VOW VCR will store the current context of the filtergraph (the context consists of the reference to the video it is playing, the frame number, etc.). If the SUV becomes linked to another video then a new filtergraph is created for the new video. If the hyperlink was instead to a web page or to an image then that is what is what is shown. The context-saving creating-the-new filtergraph process is repeated in a nested fashion if the user keeps up the process of clicking on objects within successive videos. When any of the "child" videos finishes then the control returns to the filtergraph of the "parent" video and so on. This is very much analogous to program structures and procedures where the called procedure, once finished returns to the calling (parent) procedure.

4. Displaying Hyperlinks in Streaming Digital Hypervideo

As explained in the BACKGROUND OF THE INVENTION section of this specification, hyperlinks that are embedded in both the digital data, and occasionally (but not necessarily) in the overt displays, of streaming digital hypertext are not always easy to visually (or audibly) recognize. The author of the hyperlink who inserted the hyperlink within the hypervideo can, of course, make the link as blatant or as subtle as he or she desires. However, the subscriber/user/viewer of the hyperlink should also logically have a role in the hyperlinking process more sophisticated than just "accept" or "decline". In some hypervideo presentations the subscriber/user/viewer may be alert to hyperlinks, and desirous of seeing and/or exploring the same. In other presentations the same hyperlinks may, if sensed at all, constitute an irritant and/or an imposition. Logically the subscriber/user/viewer would be able to set his or her hypervideo viewer to accentuate, or to suppress, hyperlinks in a manner that is remotely analogous to the way that cookies may be accepted or declined by a browser program during Internet browsing.

Accordingly, in one of its aspects the present invention is embodied in a method of displaying hyperlinks in streaming digital hypervideo, and of selectively so displaying these hyperlinks.

The method involves receiving streaming digital hypervideo, extracting hotspot data from hypervideo data that is within the received hypervideo, and displaying the decompressed hypervideo with accompanying hotspots in accordance with the extracted hotspot data. In the preferred display a grid, or a coloration, or some other visually perceptible "clue" will overlay or alter a scene object whereat exists a hyperlink. By these simple steps the location of hyperlinks within the streaming digital hypervideo need not be guessed at, but may be directly visually discerned by a subscriber/user/viewer.

The receiving is typically of streaming digital hypervideo across a digital communications network. The receiving may further be of compressed streaming digital hypervideo, in which case the method further entails decompressing the received hypervideo and the extracting of hotspot data is from hypervideo data that is within this decompressed hypervideo.

The overlaying of the hotspots is preferably done for individual hypervideo frames by use of a rendering filter responsive to the hotspot data; the hypervideo fame being displayed with the overlaid hotspot. The rendering filter is more particularly preferably supplied with (i) shapes and (ii) sizes of the hotspots in accordance with the hotspot data.

This same aspect of the invention may alternatively be manifest in a system for displaying hyperlinks in streaming digital hypervideo.

Such a system includes a receiver of compressed streaming digital hypervideo across a digital communications network, a process for decompressing the received hypervideo, and a process for extracting hotspot data from hypervideo data that is within the decompressed hypervideo. A display displays (i) the decompressed hypervideo, in accompaniment with (ii) the hotspots in accordance with the hotspot data. The location of hyperlinks within the streaming digital hypervideo may accordingly be discerned by a viewer of the display.

5. Enabling Transient Hypervideo Hyperlinks Sufficiently Long So That the May Reasonably be Acted Upon by a Subscriber/User/Viewer of the Hypervideo As explained in the BACKGROUND OF THE INVENTION section of this specification, hypervideo hyperlinks may, and regularly do, move on the video display screen along with the object (or event) with which they are associated. The objects and events, and their associated hyperlinks, may also be exceedingly transitory. The whole purpose of interactive video is compromised if the only way that a subscriber/user/viewer may be assured of "catching" and exercising a hyperlink is to remain tensely poised on the unfolding video, ready to both make near instantaneous judgements and to physically "spring like a cat" when the opportunity to profitably hyperlink presents itself. This much tension can ruin the hypervideo viewing experience.

Accordingly, in another of its aspects the present invention is embodied in a method of parsing and displaying streaming digital hypervideo so that not only may hyperlinks embedded therein be clearly seen by a subscriber/user/viewer (who so desires to see these hyperlinks), but so that, regardless that the hypervideo unfolds in normal time, the hyperlinks may be seen sufficiently long so as to reasonably be acted upon by the subscriber/user/viewer.

The preferred method includes receiving streaming digital hypervideo, detecting scene changes in the received streaming digital hypervideo, and generating a multiplicity of keyframes (thumbnail images) each of which is indicative of the hypervideo that is within a corresponding one of a multiplicity of successive scenes as are defined by the detected scenes changes. Any hypervideo link within the hypervideo scene is preserved in the scene's keyframe, or thumbnail image.

Recently-received digital hypervideo and the multiplicity of keyframes (thumbnail images) corresponding thereto are cached in a digital data cache.

The received streaming digital hypervideo is displayed in normal time. However, a plurality of keyframes (thumbnail images), part of the multiplicity ultimately generated and which are indicative of the received streaming digital hypervideo most recently previously displayed, are also displayed as static images.

Herein lies the advantage. A subscriber/user/viewer of the composite display may click through a hyperlink that is upon a displayed keyframe or thumbnail image (and thereby branch the receiving or the playing of digital hypervideo, or both the receiving and the playing) even though the exact scene in which the hyperlink was present has already been displayed in normal time!

The hyperlinking is "after the fact" of the associated (hyper)video display. The subscriber/user/viewer need not pounce upon a hyperlink as it moves spatially rapidly or temporally transitorily (or both spatially rapidly and temporally transitorily) in the normal-time display of the received streaming digital hypervideo. Instead, the subscriber/user/viewer can click through upon a hyperlink within a displayed static keyframe (thumbnail image) at his or her leisure as and when desired.

There is even a role for this "delayed" or "postpone" in advertising. Subscriber/user/viewers may well prove willing to click on hyperlinks appearing in (hyper)video entertainment—even if they know that so doing takes them to commercial messages and information—but not if they are thereby force to "miss" the unfolding (hyper)video show. What a user is willing to view after a show, or at a scheduled commercial break, is entirely different that what the viewer is willing to stop, or even just interrupt, his or her pleasurable viewing experience in order to explore. The logical time to follow hyperlinks is after they have been viewed and assimilated, and when it is convenient to do so. The present invention permits this, and a hypervideo hyperlink may typically be followed after the lapse of many minutes from its first presentment.

6. Retroactively Initiated Recording and Replaying (Playback) of Streaming (Hyper)Video As explained in the BACKGROUND OF THE INVENTION section of this specification, as Gutenberg permitted every man to become his own printer, and Carlson every man his own publisher, hypervideo permits every man to become his (or her) own videographer. Alas, there is one difference. The printed, or the photocopied, word or picture does not "disappear" into the ether while one is trying to work with it. Of course, digital (hyper)video data does not really disappear, and resides in files. However, it disappears from view, and it is exceedingly more difficult to link files the visual contents of which are only in one's head than it is to "drag and drop" (hyper)video. Here is both the glory, and the curse, or hypervideo. Video linkage theoretically becomes easy. Alas, the video will not "hold still", and prospective manipulators of the video segments (i.e., videographers) are reduced to dealing with these segments as abstractions. The present invention solves this problem, again by permitting retroactive action (distorting video time, as it were).

In yet another of its aspects the present invention is embodied in a method of retroactively initiating the replaying (i.e., playback) and/or the recording (and linking) of streaming digital video (hypervideo). This retroactive replaying and/or recording transpires regardless that at least some of the streaming video (hypervideo) has already been displayed while further of the streaming video (hypervideo) is likely still inexorably unfolding in normal time. The method accords a user-viewer of the video (hypervideo) both (i) a grace period in which to retroactively commence replaying and/or recording the streaming video (hypervideo), and (ii) a means of indicating a past point in the streaming video (hypervideo) at which point the replay or recording is now retroactively to start, in the present time.

This method of "indexed" retroactive replay and recording of streaming digital video includes receiving streaming digital video (hypervideo), detecting scene changes in the received streaming digital video (hypervideo), and generating a multiplicity of thumbnail scenes, or keyframes, each of which is indicative of the video that is within a corresponding one of a number of groups of successive scenes, the limits of group of scenes being defined by the detected changes.

Recently-received digital video, and a multiplicity of keyframes corresponding thereto, are cached in a digital data cache.

The received streaming digital video is displayed in normal time. However, a plurality of keyframes, part of the multiplicity ultimately generated and which are indicative of the received streaming digital hypervideo most recently previously displayed, are at least temporarily displayed as still images, normally in a first-in, first-out (FIFO) file of such scene images.

Video may then be selectively replayed and/or recorded (a form of hyperlinking) in response to a user-viewer's selection of a displayed keyframe. This replay and/or recording (hyperlinking) commences with the video corresponding to the keyframe as is stored within the cache and then, should it last so long, proceeds with the replaying and/or recording of the received streaming video.

By this process the user-viewer may beneficially commence replaying and/or recording (by hyperlinking) the streaming digital hypervideo retroactively.

These and other aspects and attributes of the present invention will become increasingly clear upon reference to the following drawings and accompanying specification.

BRIEF DESCRIPTION OF THE DRAWINGS

FIG. 15 shows the basic structure of the Video Map file where every GOP (Group of Pictures—working to about half a second of video) begins with a table with three fields: shape ID's, corresponding links and corresponding annotations.

DESCRIPTION OF THE PREFERRED EMBODIMENT

Figure 1:
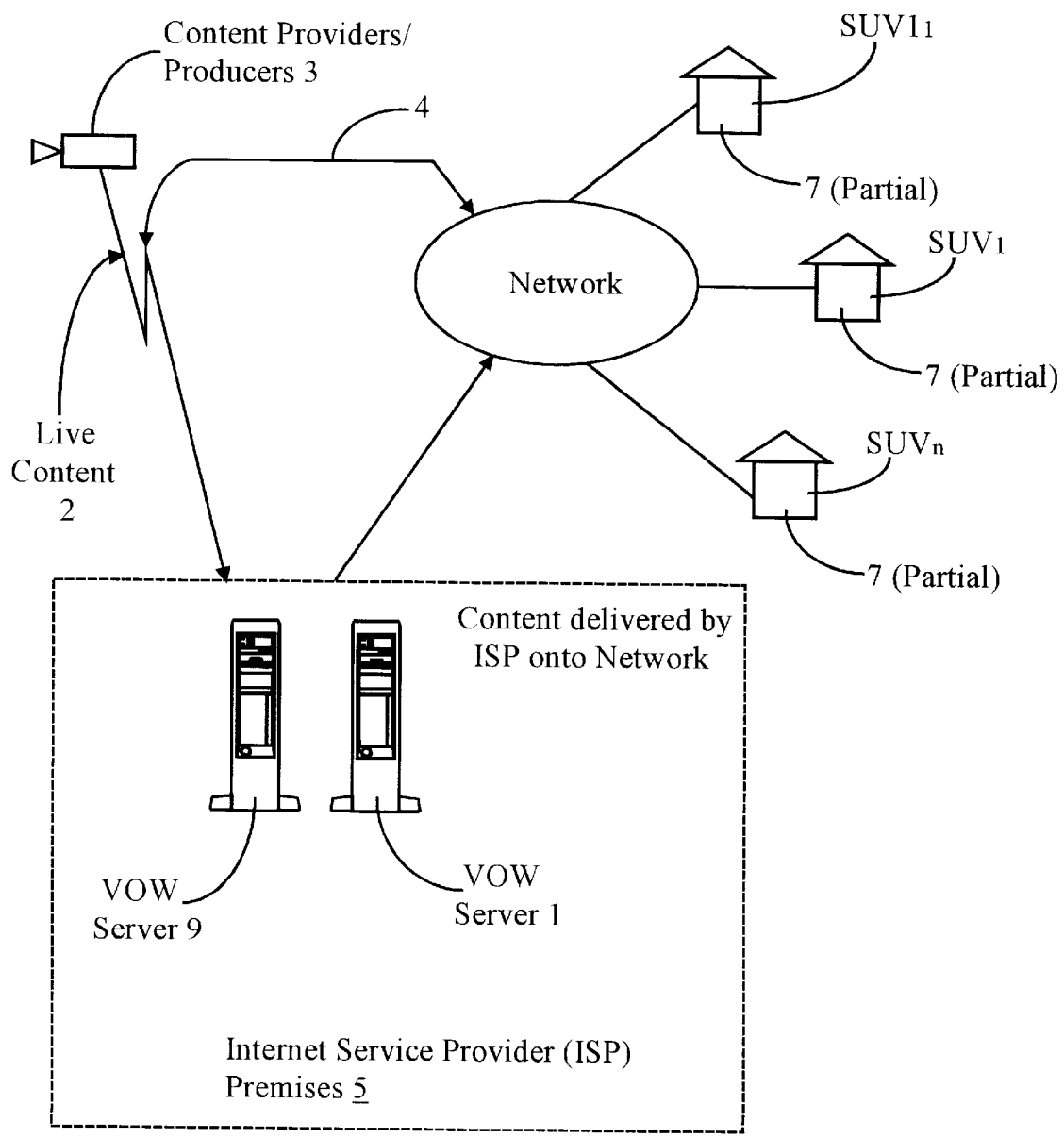
FIG. 1 is a diagrammatic view of the origin and transfer of digital video/hypervideo data upon a digital network to multiple Client subscribers/users/viewers (SUVs) of the present invention, including through, by way of example, an Internet Service Provider (ISP) or a Local Network Affiliate (LNA) acting as the essential special server, or VOW Server, where hyperlinks within hypervideo may be dynamically resolved.

The present and related inventions contemplate computer systems and software tools that can automatically: 1) analyze an incoming stream of video for scene changes in real-time; 2) cut/copy/paste from/to the video; 3) hyperlink a hotspot object in the moving video to another video; 4) record any set of scenes; and 5) build a mosaic or album of interesting scenes. The present invention—which more particularly concerns functions 3) through 5)—is thus but one aspect of a more extended concept.

1. Environment, and General Purpose, of the Present Invention

The present invention may be considered to be analogous to a digital TV and/or a digital video VCR—but with a big difference. The invention is manifest inside a subscriber/user/viewer's web browser page where it plays not only streaming digital video, but streaming digital hypervideo. The hypervideo has objects in it, which are called "hotspots". The user can click on these hotspots as the video is playing and jump to another video, or hypervideo, or web page, or even initiate a web based transaction—all depending on the hot links associated with that object. For the user, it makes video viewing interactive and exciting. For the content provider it opens up a mind-blowing variety of possibilities.

Some of these functions have previously been contemplated for hypervideo. However, realizing the full range of these broad functions by manipulation of compressed digital video and hypervideo while it is still compressed is not known to the inventors to have previously been either described nor suggested. Moreover, there are significant problems with both (i) man (i.e., the subscriber/user/viewer) and (ii) machine (the subscriber/user/viewer's computer) in making this entire process, and all these options, work smoothly and seamlessly. If the process and the options do not so work, then the process of presenting or following or both presenting any following hypervideo hyperlinks becomes very disjointed, and spasmodic. The subscriber/user/viewer can scarcely be expected to, and does not, appreciate the stupendous verisimilitude of experiences and functions within the hyperlinks being presented to him (or her) when his (or her) screen regularly momentarily flashes blank, when hyperlinks "fly by" in a manner that makes them roughly as difficult to key on as it is to swat flying insects, and when the subscriber/user/viewer is never accorded a single moment for deliberation, when the subscriber/user/viewer starts to feel like a shocked rat on a motorized treadmill.

There is a common solution to both the problems of both man and machine: time. The machine (the computer) needs time to communicate across the network, to render things in good order, and to deliver the video seamlessly. The man needs more time to recognize, to assimilate, to think about, and, if desired, to respond to the hyperlinks. In the ensuing explanation it may be considered that the machine is not merely buffering data (digital video and hypervideo data, to be exact) but that it is buffering options, preserving their effectiveness until, by passage of time and video content, it is clear that they are meaningless. In this manner the man may move from a position of being assaulted, or pummeled, by the machine to a position of master over the machine and its endlessly streaming entertainments, options and possibilities.

The way that time is controlled starts with a video scene change detection engine. The detected video scenes are parsed and displayed as an array of static images so as to give a "bird's-eye view" of the immediate past history of the video. (NOTE; "bird's-eye views" are commonly thought of as spatial; however the same concept is extendible to temporal views, and is so used herein as opposed to, for example, more enigmatic language such as "hourglass-sand views".) Each scene is represented by a thumb-nail image.

This presentation of past scenes permits the user to quickly look at several minutes of video with just a glance. Normally after the video has been running a short time, and typically in relation to both the (i) length of the individual video scenes, and (ii) the size of the scene buffer, about 21 of the most recent scenes displayed at any one time. If the subscriber/user/viewer at any time while a scene thumbnail is still displayed decides to record the video scene which recently went by starting from the point of the thumbnail scene then the subscriber/user/viewer simply (typically, conventionally) double-clicks on (or in) the scene, and the streaming video from that point forward will get recorded for later viewing.

Interestingly, this later video viewing can transpire indefinitely later, or almost immediately. If the subscriber/user/viewer clicks on record, then the recorded video will stream back into the video viewer, and, scene by scene as and when unfolded, into the scene thumbnails all over again. If the viewer clicks record on another thumbnail scene, or even the selfsame one thumbnail scene, all over again, then the recording is essentially looped back. Therefore the viewer is not only accorded an "instant replay" of just what video, for so long, as the viewer wishes to have replayed, but may replay this video over and over again, isolating the moment of interest much as is currently done during successive instant replays of broadcast television sporting events.

This disclosure presents a system that receives compressed video signals. The video may have been encoded according to the standard adopted by the Moving Picture Experts Group (MPEG). The method taught herein shows detection of video scene transitions in an MPEG received signal. Other compression schemes may alternatively be used. Detection of scene changes in such schemes essentially involve the same scenes comparison operations as are taught herein.

The system further permits recording of received video/hypervideo as a file conforming to, nominally, the MPEG standard, and decoding and playback of interactive video (hypervideo). Links authored in interactive videos can be followed to play other related videos. This system is capable of performing all stated operations in real-time; scenes transitions are detected, video is cached and recorded and video hyperlinks are followed while the video is being played. The system allows automatic caching of detected video scenes, with each scene being represented by a keyframe (a thumbnail image). The system enables a user to specify the starting point of a recording to be either from current playback position or from the start of a stored scene.

2. Specific Nature, and Purposes, of the Present Invention

The present invention is embodied in a player and hyperlink interpreter for streaming digital hypervideo. The invention is implemented as a software process, normally a web-page-embeddable plug-in, which resides in a web browser. The web browser may be hosted by the end-user's, or SUV's, (i) PC, (ii) digital TV or (iii) TV enhanced by a set-top box device. The present invention can alternatively be embodied in a dedicated computer, TV, or computer-TV product that independently executes the software processes of the invention.

The principle features of the player in accordance with the invention are as follows. It serves to play streaming hypervideo and/or video from a video-on-demand server, either as is uniquely transmitted to the player of as is part of a common stream which is being multicast.

In the playing of hypervideo, the SUV can click on hotspots—typically appearing as translucent overlays in the video—so as to be hyperlinked (transported) to another video or web page, or so as to trigger an event such as a slide show or an interactive session or activate an e-commerce transaction. The triggered event commonly involves remote communication upon the digital network such as, most commonly, to receive information that may include a commercial, but the triggered event may be exclusively local, for example to retrieve and display and/or play a record file (which may again be a commercial) (which file may be of any audiovisual or information type) that had previously been transmitted and locally stored.

The player detects scene change points, and displays thumbnail images representing scenes in the video/hypervideo.

The player permits replay and/or recording of video or hypervideo in response to user clicks on any displayed scene(s).

The player of the present invention is fully compatible, and interactive, with a special server of the related patent application for HYPERLINK RESOLUTION AT AND BY A SPECIAL NETWORK SERVER IN ORDER TO ENABLE DIVERSE SOPHISTICATED HYPERLINKING UPON A DIGITAL NETWORK STREAMING DIGITAL HYPERVIDEO FROM A NETWORK HYPERVIDEO SERVER TO NETWORK CLIENTS; INCLUDING FOR PROVIDING FULLY CUSTOMIZED HYPERLINKS, SECURITY, AND/OR CONTESTS AND LOTTERIES TO THE CLIENTS BOTH COLLECTIVELY AND SEPARATELY. The player cooperates with the special server to obtain customized interactive commercials, dynamic hyperlinks, security information, text captions and other control information. So obtaining digital information from alternate sources, the player has the ability to insert this information, most commonly customized commercials, at specific points in the streaming video or hypervideo as well as, when the hyperlink so dictates, to completely suspend the (video or hypervideo) display in progress and to branch to a new display.

Very notably, a hyperlinked branch to a new display does not cause that receipt of the next previous (i.e., usually the "original") video-hypervideo stream should be suspended. Instead, both the "old" stream and the "new" stream (if the "new" is indeed a "stream") are received, in an interleaved manner, during the same time period, much in the manner that multiple web browsers may currently run concurrently under multi-tasking operating systems. This means that when a SUV that has exercised a hyperlink branches back to the video/hypervideo left off from, then playback resumes at from the very place left off from.

This is very useful for two reasons. First, when the streaming video is being multicast, it makes that the modest duration (less than ten minute cumulative) suspensions of main-feed viewing encountered by most SUVs in following most hyperlinks does not necessitate re-synchronizing a new video/hypervideo feed to the suspending/hyperlinking SUVs. Instead, and although the screens of adjacent SUVs with different hyperlinking histories may well not show identical progress from moment to moment, most SUVs will be taking down the same, multicast, video/hypervideo feed. This preserves network bandwidth. It should be understood that, in many and likely in most cases, a custom or semi-custom video/hypervideo feed to so few as one particular SUV can be started and maintained. It is simply that totally separate, but redundant, streaming video feeds for each of hundreds, and thousands, of SUVs is undesirable, and the player of the present invention serves to, by and large, avoid this.

Second, the ability to "pick up where one left off" is fundamental to encouraging SUVs to exercise hyperlinks. The SUV soon learns that he/she/they do(es) not miss anything in the main video/hypervideo feed by act(s) of hyperlinking. Therefore hyperlinks, which include hyperlinks to commercials and/or to expository information containing commercials, may readily be taken without incurring an onus, or penalty, in viewing of the main (hyper)video program. It effectively becomes possible—and is so permitted by a control "button"—for the SUV to "pause" (at least so far as it appears to him/her) streaming digital video in order to go to the kitchen, or the bathroom.

The player of the present invention is offered into the market in a software component form so as to facilitate that a the web designer may selectively design certain attributes of the video/hypervideo rendering. For example, the web designer may select the particular "VCR" control and playback "buttons", choose the size of video window playback, and/or associate particular channels with the video playback.

Accordingly, the digital hypervideo system player, and playback method, of the present invention supports many functions.

A compressed, typically an MPEG compressed, digital video/hypervideo stream available either on a local machine or, as a Universal Resource Locator (URL) on an Internet web server, may be accessed under user control.

Video scene changes are detected in real-time. As video is being fetched and played back, scene transitions are flagged automatically, and boundary frames for each scene are noted.

A representative frame, also known as a keyframe or thumbnail image, is generated for each scene (as is delimited by the scene's start and end frames).

A portion of video being fetched can be cached in temporary storage, and may subsequently be played back from this cache storage.

The viewer-user may initiate recording of the digital video/hypervideo from the current play position, and as a valid MPEG (or other compressed) stream. Recording can stop on user action.

More unusually, the user can also initiate recording of the digital video/hypervideo, still as a valid stream, from the start of any scene which is cached in the temporary storage (and which is represented by a keyframe, or thumbnail image). Once commenced, the recording can continue to save all video frames then stored in the cache storage (after the point of initiation) as well as any new video/hypervideo frames being received and cached. The viewer-user may stop recording at any time.

Compressed hypervideo streams contain hyperlink information may be played back.

Hyperlink information in a compressed (hyper)video stream may be decoded, with pre-authored objects of interest marked in the playback video.

Visual cues are provided to indicate an object of interest in a video as "hot" and thus selectable.

The viewer-user may make a predefined action when an object of interest has been selected, typically by clicking on it. The typical predefined action is the playback of a different video, or playback of a different segment from the same video or connection to an Internet web site, using the Universal Resource Locator (URL) of the video.

3. The Preferred Embodiment of the Invention

A schematic of the total content delivery environment in which the video-hypervideo player of the present invention operates is shown in FIG. 1. The content is delivered by the ISP into a high speed communications cloud (network) and is consumed by clients, most of whom are home users. The player resides at the client site where it serves to play rich, interactive, hypervideo content.

The ISP in turn receives the content from content providers—either live or on stored media. The ISP broadcasts this content as live content, and/or makes it available in stored format on the video server. The special server—described in a related patent application—serves to inserts local, rich, interactive commercial content by the method of dynamic hyperlinking.

In greater detail, the schematic block diagram of FIG. 1 shows a preferred digital hypervideo communication system including a special dynamic hyperlink-resolving server, called a Video on Web Server, or VOW Server 1 cooperatively interactive with a client subscribers/users/viewer, or "SUV", 7 of the present invention. FIG. 1 diagrams the total content delivery environment in which the VOW Server 1 operates.

Live content 2 is produced by network content providers/producers 3, and is delivered onto the digital network 4 by the Internet Service Provider, or "ISP", 5. The content 2 is delivered by the ISP 5 onto what may be considered a high speed communications "cloud" in the form of the network 4, and this content 2 is consumed by client subscribers/users/viewers, or "SUVs", 7, most of whom are typically home SUVs. The ISP 5 in turn receives this content 2 from content providers/producers 3, either live or on stored media. The ISP 5 broadcasts this content 2 as live content or else makes it available in stored format on the video server 9. The VOW server 1 inserts local, rich, interactive commercial content using the dynamic hyperlink resolution and dynamic hyperlinking method of the present invention.

During delivery of content 2 onto the network by the ISP 5, the delivered hypervideo is stored upon the video server 9 and delivered on demand to the SUVs 7. The delivery may be in any part multicast (meaning to more than one SUV 7 at the same time). The delivery is by definition multicast if the hypervideo content is from a live video feed. Hotspots and associated hypervideo links, or hyperlinks, are always first delivered in the streaming hypervideo from the video server 9.

The hotspots and associated hyperlinks, which are typically links to advertisements or advertising-related promotions (directly, or indirectly in accordance with the present invention the explanation of which is ensuing) may be inserted either into stored, or into live, video content 2. Of course, if inserted into live video then the hotspots and associated hyperlinks have to be so inserted in real time. A companion patent application for REAL-TIME TARGETED INSERTION OF VIDEO CLIPS, HYPERVIDEO CLIPS AND/OR HYPERLINKS IN COMPRESSED STREAMING VIDEO, INCLUDING DYNAMICALLY AT MULTIPLE POINTS BETWEEN CONTENT PROVIDERS AND SUBSCRIBERS IN DIGITAL NETWORKS teaches how this is done. The hot links and associated hyperlinks may be inserted into hypervideo that goes to as few as one single SUV 7, or into hypervideo that is multicast to many SUVs 7 at the same time. In other words, any individual Client SUV may rarely be receiving hyperlinks that are custom (if not also hotspots that are also custom, which is rarer still.) Normally, however, in accordance with the present invention many Client SUVs, especially those linked by geography or demographics or other affinity grouping, will be receiving at least some of the same (i) hotspots and (ii) associated hyperlinks. Note that these Client SUVs need not receive these same (i) hotspots and (ii) associated hyperlinks at the same time. Moreover, and in accordance with the invention presently being explained, an initial receipt of the same (i) hotspots and (ii) associated hyperlinks at each of several Client SUVs does not necessarily mean that, should each "click through" on a hotspot/hyperlink, that each will ultimately access the same network resource.

The connection of the ISP 5, and also the SUVs 7, to the high speed network 4, or, typically, the internet, can be through any of (i) a cable modem network, (ii) a satellite network, and/or a (iii) ADSL (a telephone network).

The SUVs 7 are necessarily connected to the network, typically the internet and more typically the world wide web, through a high-speed link—normally, a cable modem—in order to support video/hypervideo. The SUVs 7 each independently view and interact with the hypervideo (and other video and downloaded content) through a software-based functionality called, for purposes of continuity with the previous acronym of "VCR" (i.e., a Video Cassette Recorder), a "Video On Web Video Cassette Recorder" (although no cassette likely exists), or simply a "VOW VCR". The function of such a VOW VCR is taught in a companion patent application. Basically it behaves like a VCR to play and record video with the added function that it can respond to click-throughs on hotspots to interpret and respond to associated hyperlinks—normally by going out onto the network 4 to a designated URL, and most normally to (some portal of) the VOW server 1.

Figure 2:
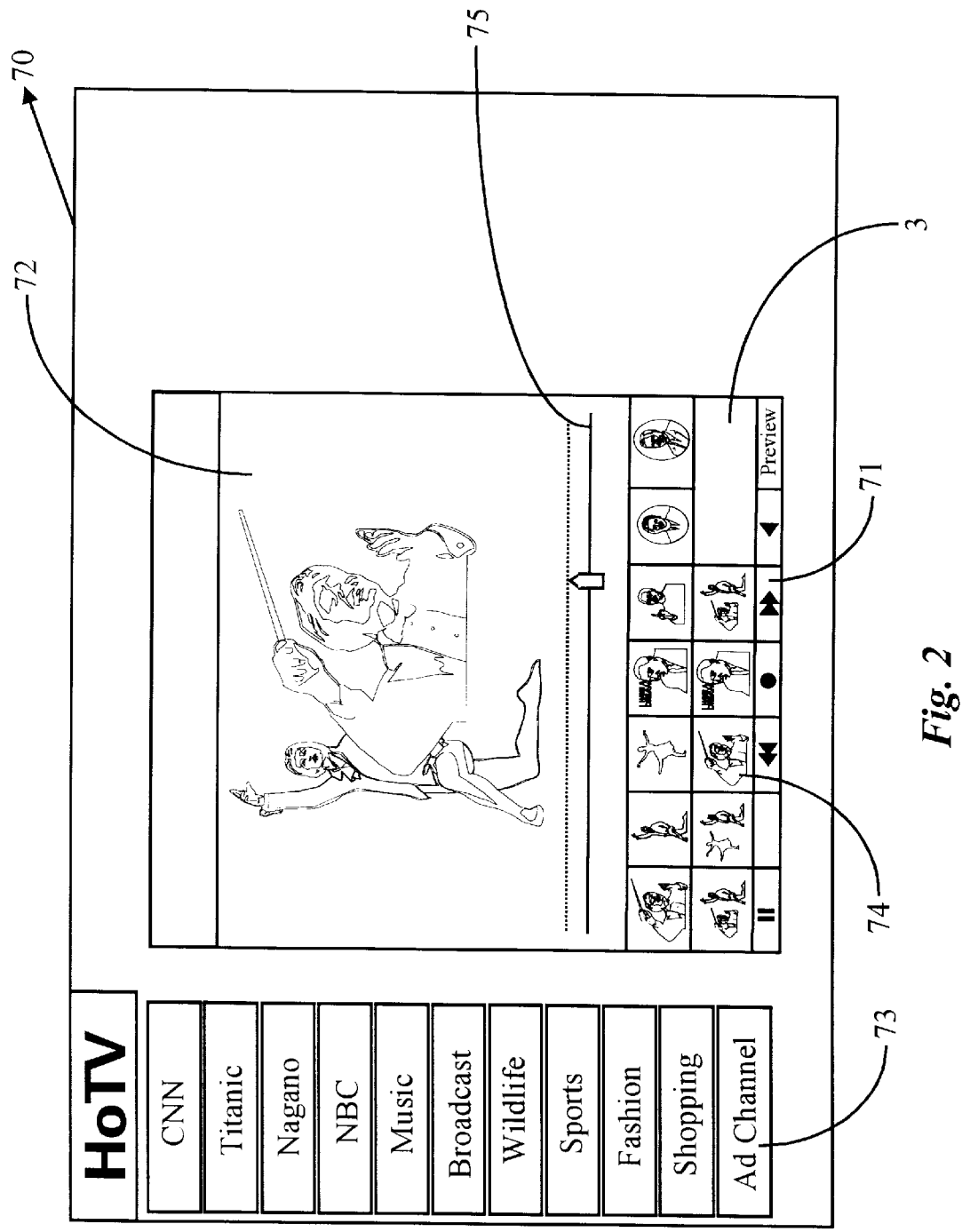
FIG. 2 is a pictorial representation of a screen shot such as might be seen on a monitor of a Client SUV of the present invention, this Client SUV being within the system of the present invention previously seen in FIG. 1.

A typical web front end with the player of the present invention embedded in it, and with various other components, is shown in FIG. 2. The designer of the web page uses the various components of the player (illustrated in the diagram)—also fixing the size of each of them and associating channels with the tabs. These channels may be either of the video-on-demand type or of the multicast type.

Figure 4:
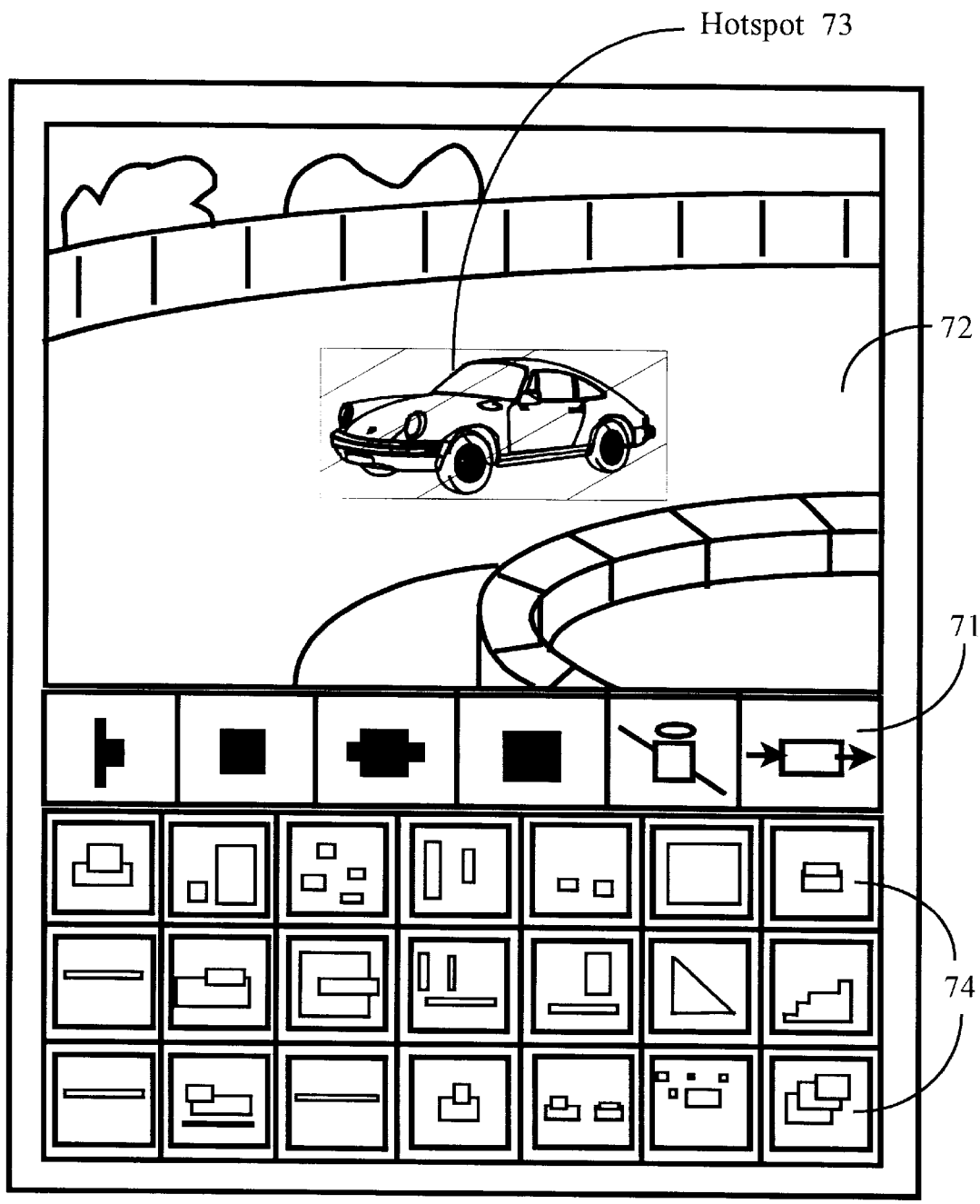
FIG. 4 is a pictorial view of one preferred display at a Client SUV whose VOW VCR is playing hypervideo.

In greater detail, FIG. 4 shows one preferred manner of the viewing of hypervideo at the VOW VCR of each SUV 7. A first, primary, screen out of several potential such screens is shown. The "video-on-web" VCR, or "VOW VCR" clearly acts as a web-based playback client through which a SUV 7 can select channels, just as the SUV might with a normal TV, so as to play back hypervideos or just plain videos. A web browser 70 fills the screen of the computer, digital TV, or TV with accompanying "black box". The VOW VCR process, which may be downloaded from some server 1 or 9 (shown in FIG. 1) upon initiation of viewing or occasion of update, but which has normally been stored in the SUV's machine, runs as a process in the manner of a "pug-in" module. The running VOW VCR process presents the usual VCR-like controls 71 for video play back including fast-forward, pause, rewind and fast-reverse. The Client SUV 7 uses a simple cursor (not visible in FIG. 4) to control the playing of stored videos, whereas for live videos clicking on an simple play-and-pause control suffices.

When playing hypervideos the VOW VCR displays the main video in one screen, as at screen 72. Channels are selectable by "buttons" 73. A slider component 74 indicates progress in the video/hypervideo viewing, and may be reset to any past point by the SUV. Note that the slider bar 74 or the fast forward of the controls 71 make it possible to "skip to the future", and to demand and receive a "future" portion of any canned, prerecorded, video/hypervideo that is being downloaded from a video server 9 (shown in FIG. 1). Note that there is no essential difference at the video servers 9 (shown in FIG. 1) in providing "future" versus providing past segments of any video/hypervideo that is prerecorded, and not live. If the video/hypervideo feed is live, it is impossible for a server 9 to skip to the future, and any request from the VOW VCR to do so is ignored.

Illustration and discussion of hotspots—and hotspots are neither always nor invariably present—is postponed until FIG. 4.

Figure 3:
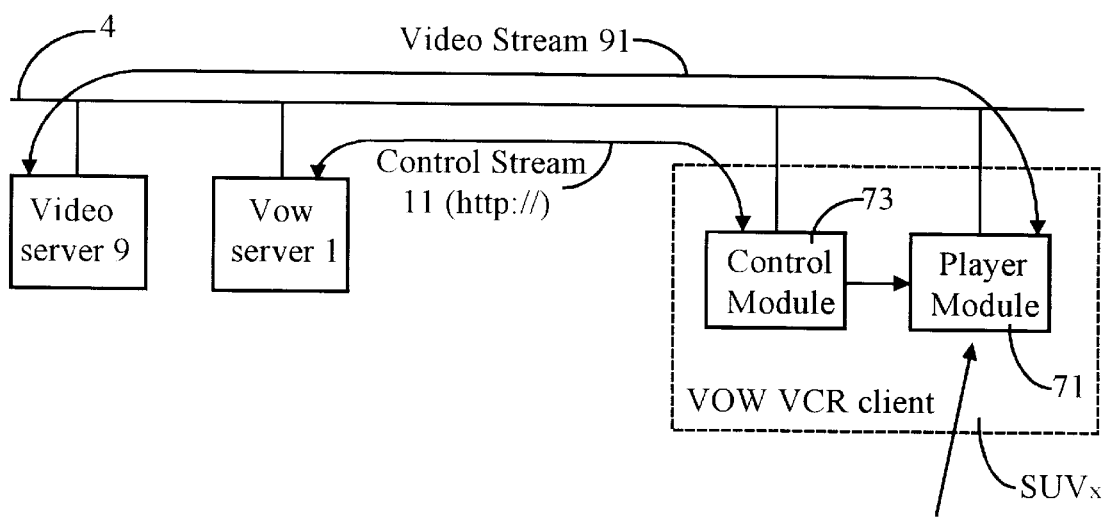
FIG. 3 is a schematic view of the architecture of a portion of the preferred embodiment of a system in accordance with the present invention (as was previously diagrammatically shown in FIG. 1), the portion includes 1) a video server, 2) a network "video on web" control server (the "VOW Server") which is commonly, and by way of example, located at a network service provider (the "ISP"), and the 3) multiple "video on web VCR's" ("VOW VCR's") of Client subscribers/users/viewers ("SUVs") in accordance with the present invention.

A schematic block diagram of the architecture of a portion of the preferred embodiment of a system in accordance with the present invention (as was previously diagrammatically shown in FIG. 1) is shown in FIG. 3. This portion includes (i) the network content provider 2, (ii) the network "video on web" control server, or VOW Server 1 which is commonly physically located at the ISP 5, and (iii) the "video on web VCR'", or "VOW VCR'" of the present invention located at the client SUVs 7, and (iv) the network 4. The video stream 91 originates at the video server 9; the control stream 11 at the VOW Server 1. Both streams 91, 11 are synchronized, and are received at the VOW VCR of a client SUV 7. More particularly the video stream 91 is received at the player module 71 of the VOW VCR of a client SUV 7 while the control stream 11 is received at the control module 71 of the VOW VCR of a client SUV 7. Both player module 71 and control module 11 will be understood to be software functions.

Consider now the alternative, isolated and extracted, screen display of the VOW VCR of a client SUV 7, that is shown in FIG. 4. A hotspot 73 is shown to be present. A text annotation (not shown in FIG. 4) preferably appears about the object when the SUV 7 does a mouse-over on the object. These annotations can beneficially serve to impart additional, supplemental, information about the scene and/or the objects in it and/or the hotspot, such as, for example, the identity of a particular person in a depicted group of persons. More commonly, however, the annotation is, or includes, or indirectly links, a Universal Resource Locator, or URL. If the SUV 7 clicks on the hotspot 73 that is associated with a URL directed to the VOW sever 1—and most are—then the video-on-web VCR (the "VOW VCR") will jump to the VOW Server 1 (shown in FIG. 1).

Third, the SUV 7 can click on a record button, and can then record the video starting at the current frame locally on his hard disk or other media provided that security privileges allow him or her to do so.

In so performing the VOW VCR display thumbnail images 74 of scenes which have been defined and delineated at the video server 9. In the case of "canned" video, these scene changes may well have been manually detected, and the scene change boundary markers long since inserted by an editor sitting at a console so as to annotate the video not in real time. In the case of "live" video as is typical of, inter alia, news broadcasts, the scene change boundaries are automatically detected at the video server 9, and the associated hyperlinks (if any, and which may be sparse in number) inserted much in the contemporaneous manner of a court reporter, or of a translator. The inserted hyperlinks may be less numerous, less well focused, less wide-ranging, and/or less versatile in a live video feed. For example, consider a newscast, and particularly the newscast sports segment. A (network) broadcast "station" employee at a computer station has readily to hand certain hyperlinks to baseball, football, basketball and hockey—if only to the league web sites where the team scores are posted. As the sports commentary and/or sports scores unfold in the live videocast, minor link insertions by this employee serve to "hyperlink annotate" this portion of the news.

At any time a certain number, normally about twenty-one, of the most recent such thumb-nail images 74, representing twenty most recent scenes will displayed. When a new scene is detected it enters the lowest corner while the oldest scene is discarded in a first-in, first-out (FIFO) fashion. The video corresponding to these twenty scenes is also buffered in FIFO fashion on local storage. The SUV can click on any of the scenes to start recording from that scene. The implication of this is that the SUV can record video which has gone by; such as a sports action shot or a talk-show dialogue.

The variation in the locations of display components between FIGS. 2 and 4 illustrates that a web designer writes scripts to bind the components together in the web page and to handle the events generated by them. The instance of the player to do the replay is triggered by the script on the web page—which in turn is activated by the event generated by the main player when the SUV clicks on a scene.

Figure 5A:
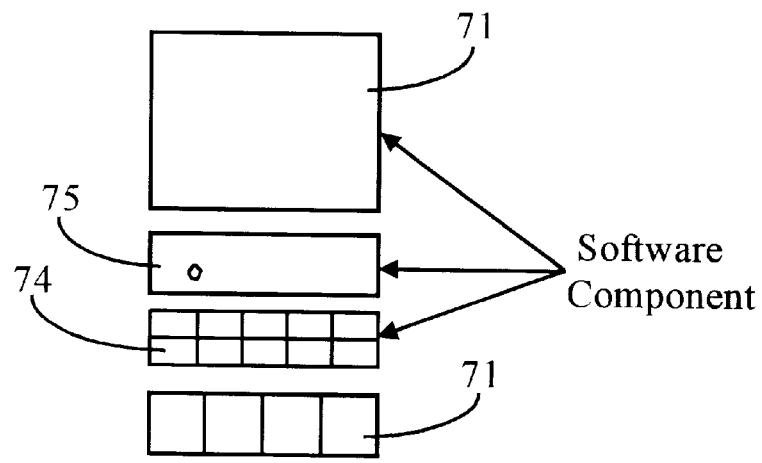
FIG. 5a is an illustration of the components of a typical screen display produced by the software processes of the present invention.
Figure 5B:
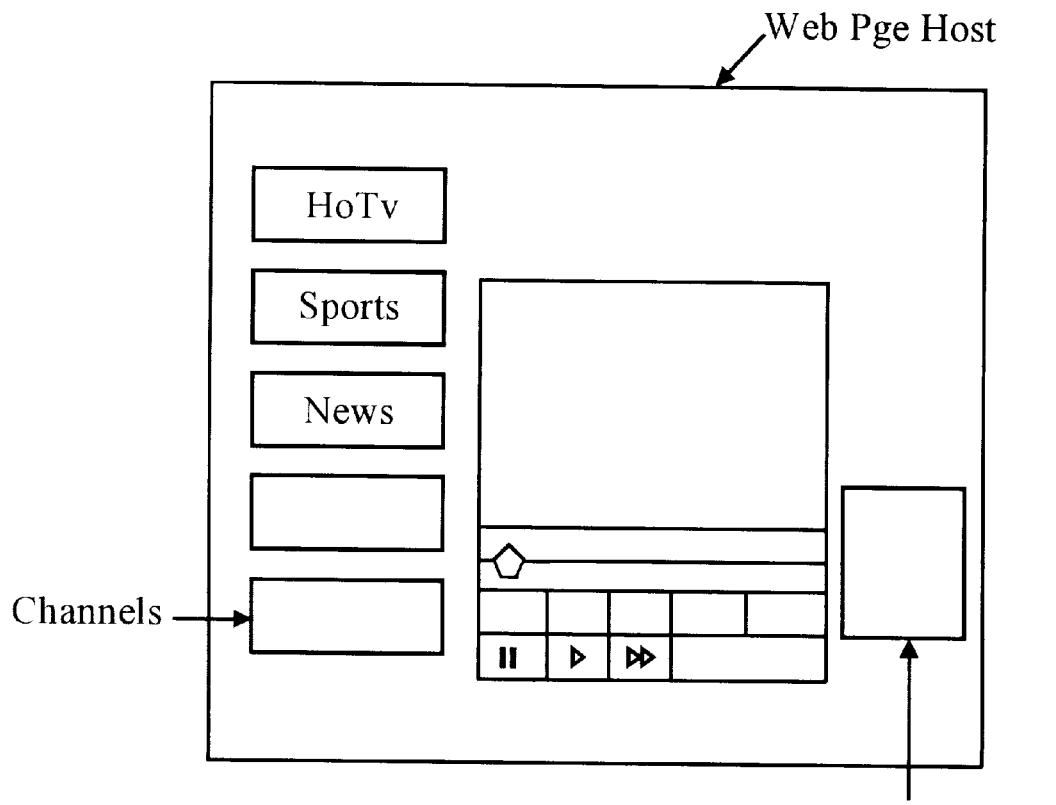
FIG. 5b is a diagram, reminiscent of FIG. 4, showing an example of the combination of the components of FIG. 5a by a web designer who writes script to bind the components together in the "web page" and to handle the events generated by them; the instance of the player to do the replay is triggered by the script on the web page—which in turn is activated by the event generated by the main player when the Client SUV clicks on a scene.

In illustration of this concept, FIG. 5a shows the several components of a typical screen display produced by the software processes of the present invention. Namely, display 71, slider bar 75, thumbnail images 74 and controls 71 are all shown. FIG. 5b is a diagram, reminiscent of FIG. 4, showing how the components of FIG. 5a might be combined by a web designer who writes script to bind the components together in the "web page" and to handle the events generated by them.

Figure 6:
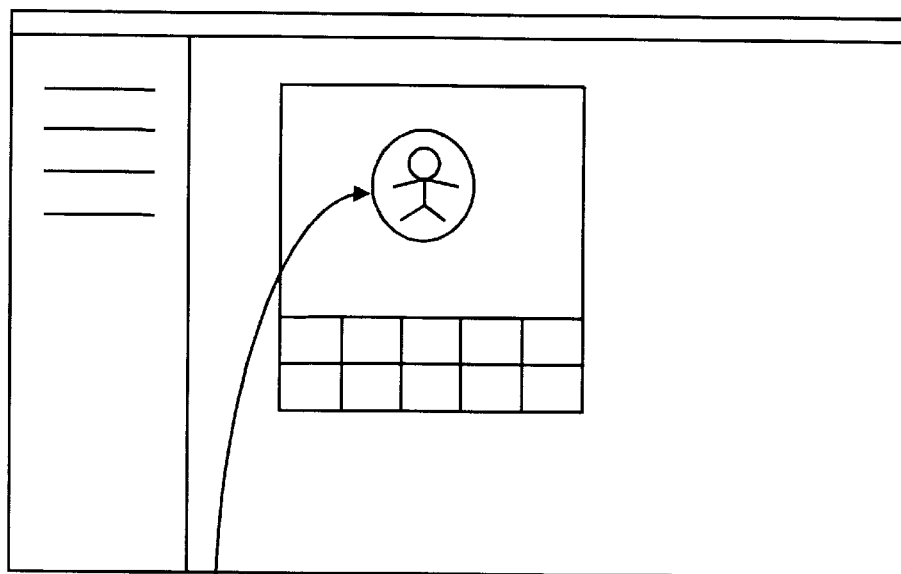
FIG. 6 is a diagrammatic view illustrating the hypervideo paradigm that a Client SUV whose VOW VCR is playing hypervideo may click on a hotspot to branch to a network page display, or "web page".
Figure 6:
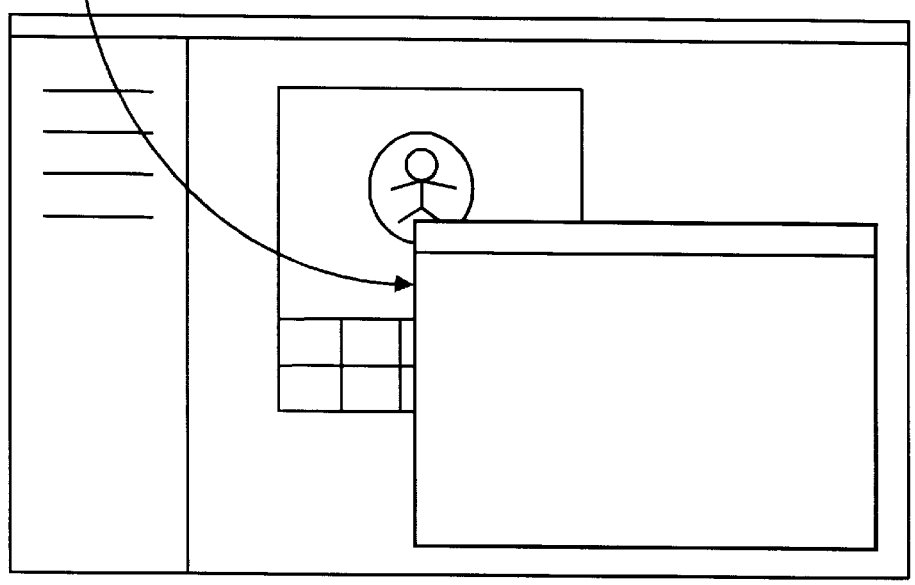

A diagrammatic view illustrating how a Client SUV whose VOW VCR is playing hypervideo may click on a hotspot to branch to a network page display, or "web page", is illustrated in FIG. 6.

Figure 7:
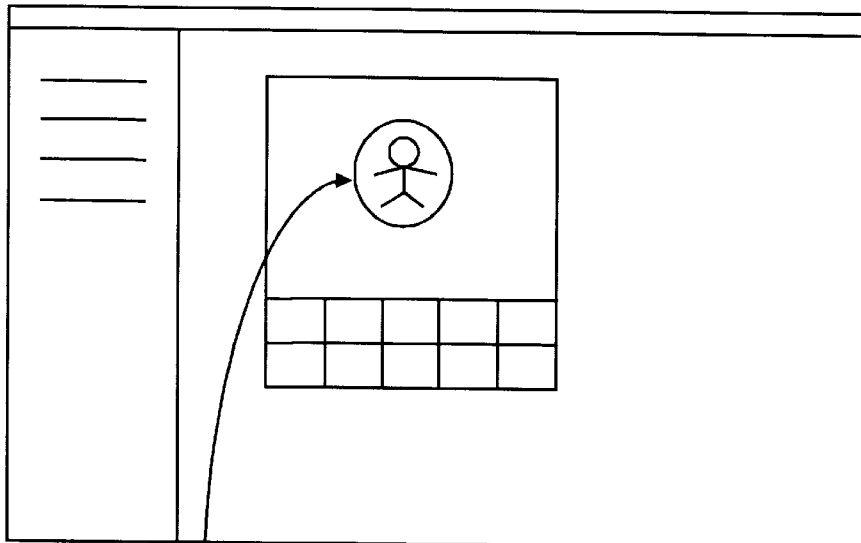
FIG. 7 is a diagrammatic view illustrating a variant of the previous FIG. 6, namely that a Client SUV whose VOW VCR is playing hypervideo may click on a hotspot to alternatively branch to another video, or hypervideo.
Figure 7:
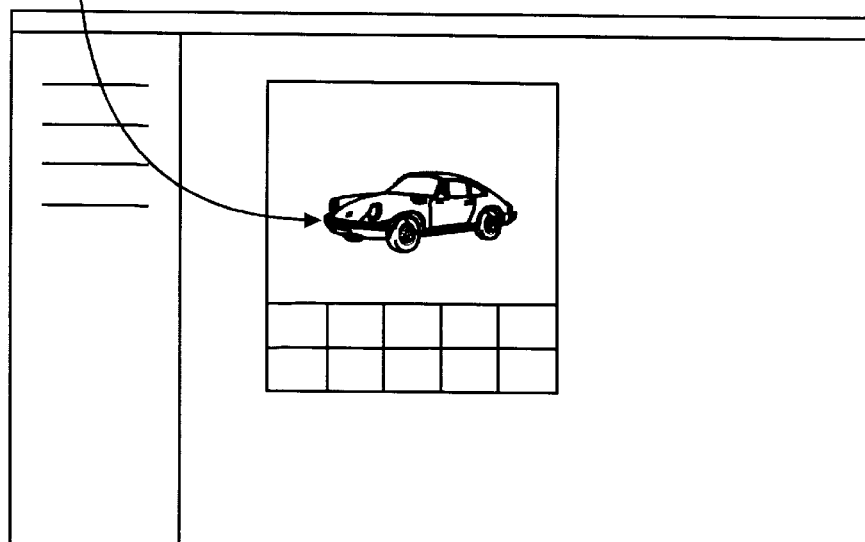

Likewise, a diagrammatic view illustrating how a Client SUV whose VOW VCR is playing hypervideo may click on a hotspot to alternatively branch to another video, or hypervideo, is illustrated in FIG. 7.

Figure 8:
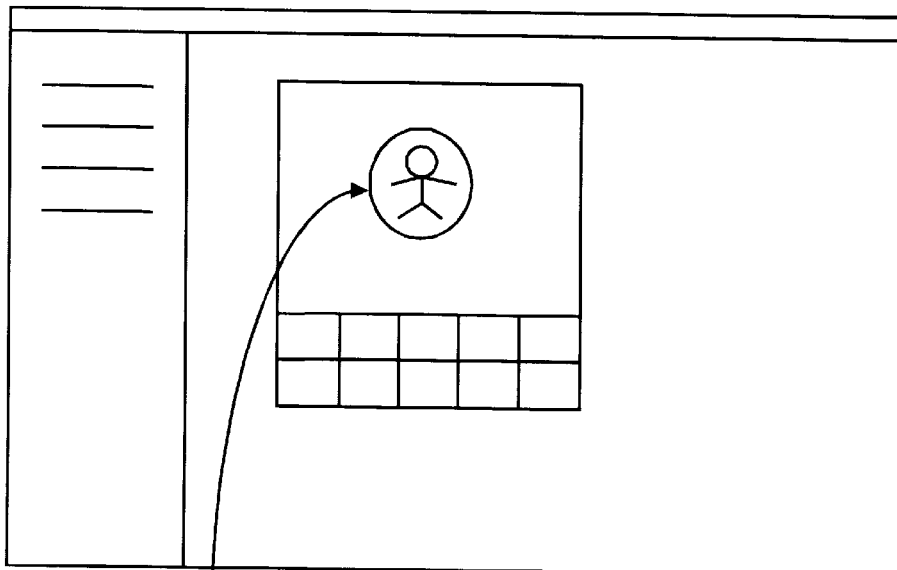
FIG. 8 is a diagrammatic view illustrating yet another variant of FIG. 6, namely that a Client SUV whose VOW VCR is playing hypervideo may click on a hotspot to alternatively branch to, by way of example among many different network resources two of which have already been diagrammatically illustrated in FIGS. 6 and 7, a slide show accompanied by audio.
Figure 8:
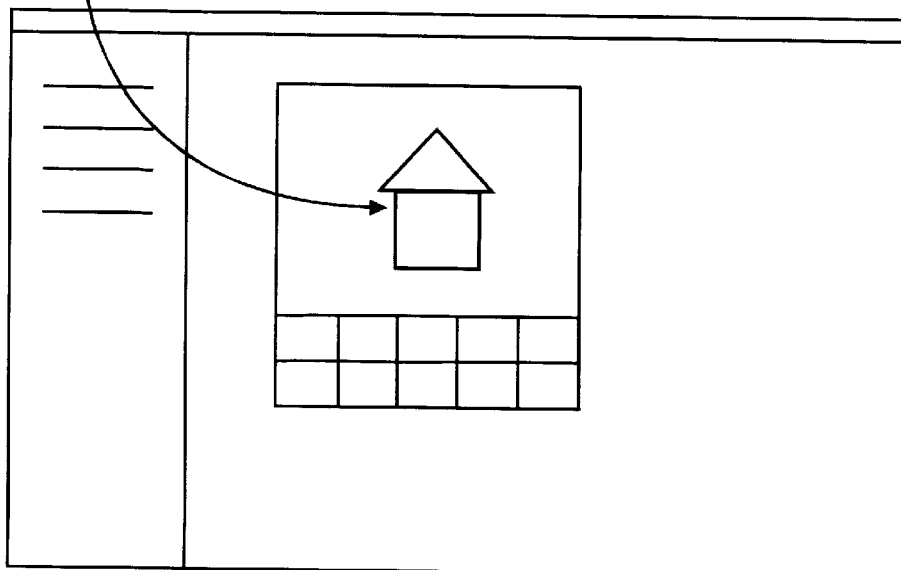

Finally, a diagrammatic view illustrating that a Client SUV whose VOW VCR is playing hypervideo may click on a hotspot to alternatively branch to—by way of example among many different network resources two of which have already been diagrammatically illustrated in FIGS. 6 and 7—a slide show accompanied by audio is illustrated in FIG. 8.

Clearly the hypervideo paradigm presents a scenario where the user jumps to another resource by clicking a hotspot associated with an abject in video.

Figure 9:
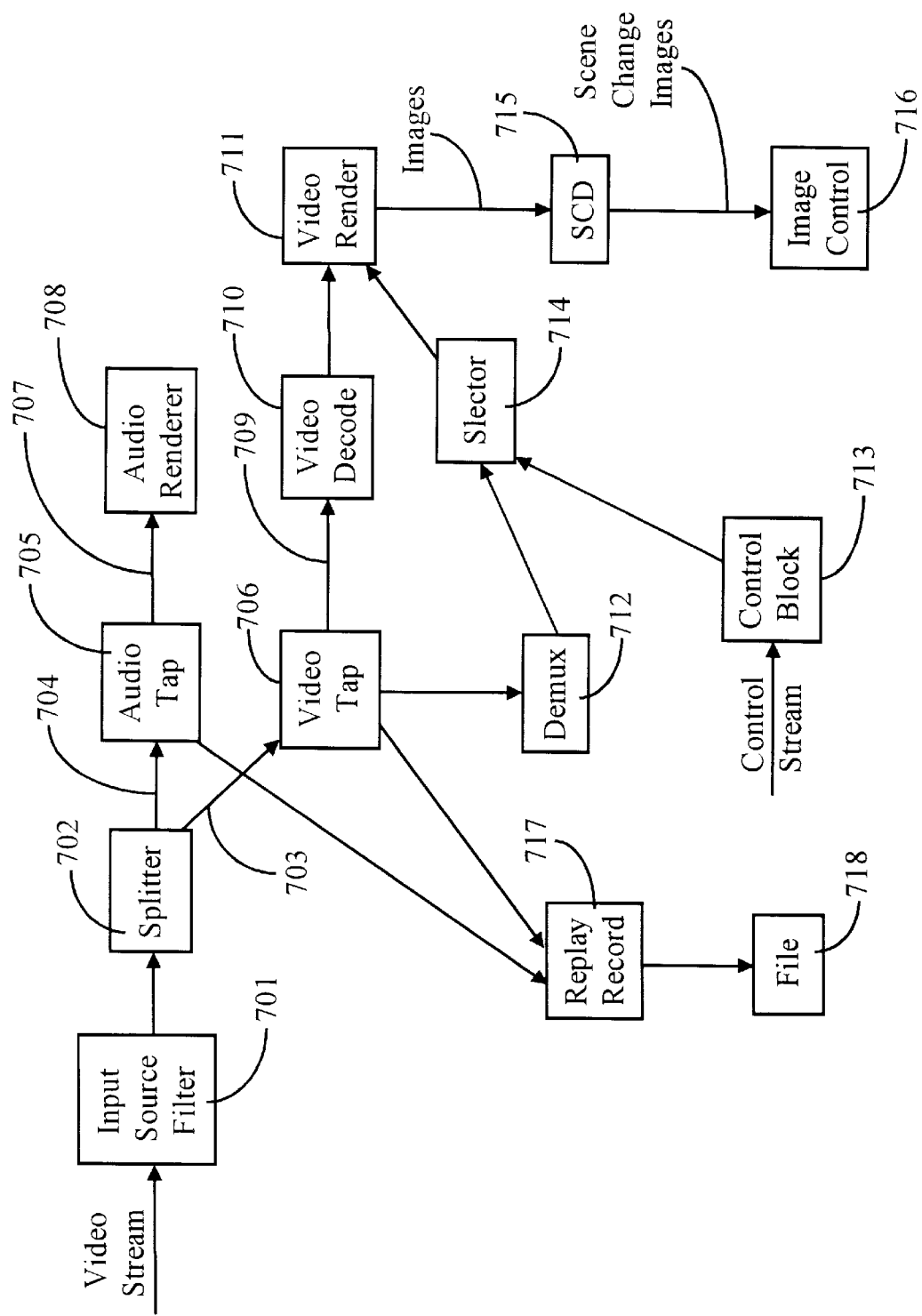
FIG. 9 is a top-level process flow diagram of the VOW VCR of the present invention, by which software-based process (i) hypervideo is displayed along with scene thumbnails, and (ii) and a Client SUV hyperlink "click-through" request is, in conjunction with the VOW Server shown in FIGS. 1 and 3, dynamically resolved.

The overall block diagram of the preferred embodiment of the VOW VCR is shown in FIG. 9. The VOW VCR architecture is built around Microsoft's DirectX™ video streaming architecture. (DirectX™ is a trademark of Microsoft, Inc.) In other words, the Direct X architecture is used as a sort of foundation and structure on which the playing and processing algorithms of the VOW VCR work.

The input source filter draws the compressed video stream either from a network or a disk. The former case can be of two types: either a video-on-demand scenario wherein the client draws a specific stream meant for itself or the client simply joins a stream that is being multicast on the net. The input source filter is built so that it can be any of the following types: (1) to support hypertext transfer protocol or local streaming; (2) to support third party video servers, or (3) user-defined. Several "flavors" of these types support different kinds of input situations. Among the supported interfaces are: (1) streaming of hypertext transfer protocol streams with a seek interface; (2) streaming from local disk with a file sharing interface; (3) streaming from specific video servers; and (4) to effect a joining of multicast streams.

From the input source filter 701, data flows downstream into splitter 702 which demultiplexes the stream into separate video stream 703 and audio stream 704. This audio and video streams 104, 703 are respectively tapped into by audio tap filter 705 and video tap filter 706. The audio output stream 707 is drawn into the audio renderer 708, and the video output stream 709 is drawn into the video decode filter 710. The last filter downstream in the video stream is the video renderer filter 711 into which the shape rendering and mouse-over-text-rendering schemes of the VOW VCR are built.

The video tap 706 feeds video data into the demultiplexing filter 712 which extracts the shape and link information from the video stream and feeds it into a queue in the video renderer 711. The renderer 711 pops the shape information for the frame it is rendering out of this queue. This facilitates hot-linking when the user clicks on a hotspot in a video and he/she is taken to another video or web page. Alternatively, this information, or a part of it, can come from control block 713 which feeds this data through selector 714 into the video renderer 711. The control stream and the compressed video stream are independently drawn by the VOW VCR player.

The replay/record 717 is activated when the user clicks on a replay or record operation. The video and audio data are fed into the replay/record 717 which mixes them appropriately and stores them into a file 718. If the operation is for replay, then another instance of the VOW VCR player plays the data off this file 718. If the user chooses to record this clip, then it is stored away as a recorded session.

From the video renderer 711, data is the image to be rendered is captured approximately every 15 frames on the average, or, more accurately (for the example of MPEG video) every I frame of a Group of Pictures (GOP), and fed to the Scene Change Detection module SCD 715 which does the scene change detection. If a scene change is detected then the SCD module 715 passes on the scene information to the image control 716 which renders the scenes as thumb nail images 74 on the portion of the screen just below the main playback screen 72 (screens variously shown in FIGS. 2, 4 and 5). The sampling every 15 frames translates to about sampling every 0.5 second interval.

Figure 10A:
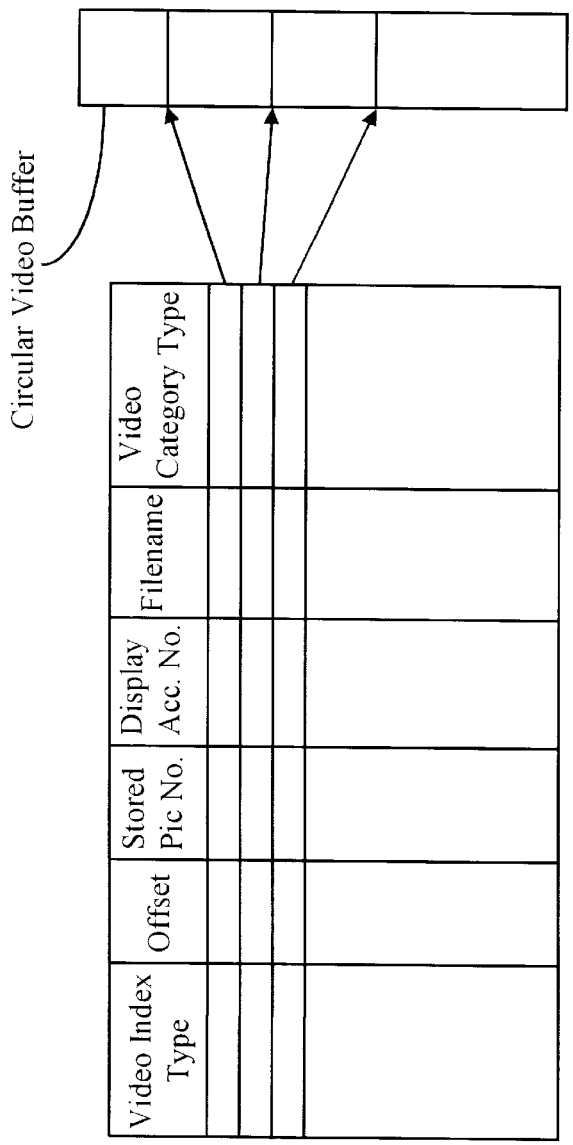
FIG. 10, consisting of FIG. 10a and FIG. 10b, is a diagram showing the structure of the video and audio buffers and the corresponding index entries; these video and audio buffers are filled in a circular fashion and they facilitate scene-based replay and recording; they contain data corresponding the thumb nails (scenes).
Figure 10B:
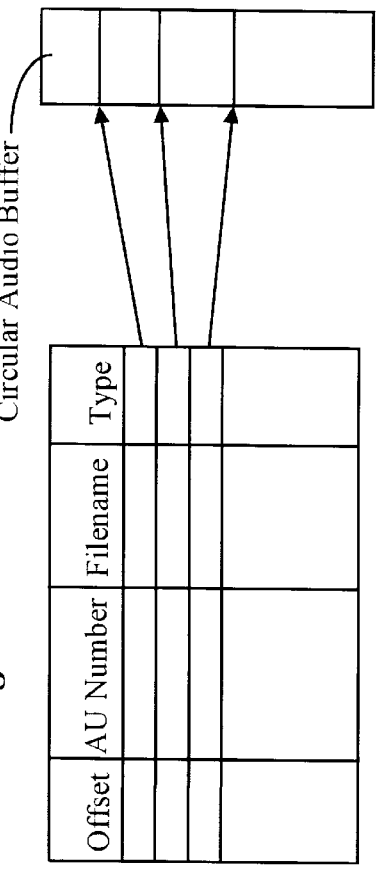

FIG. 10 shows the structure of the video and audio buffers and the corresponding index entries. The video and audio buffers are filled in a circular fashion and they facilitate scene-based replay and recording. The buffers contain data corresponding the thumbnail screen scenes 74 (thumbnail screens variously shown in FIGS. 2, 4 and 5).

Figure 11:
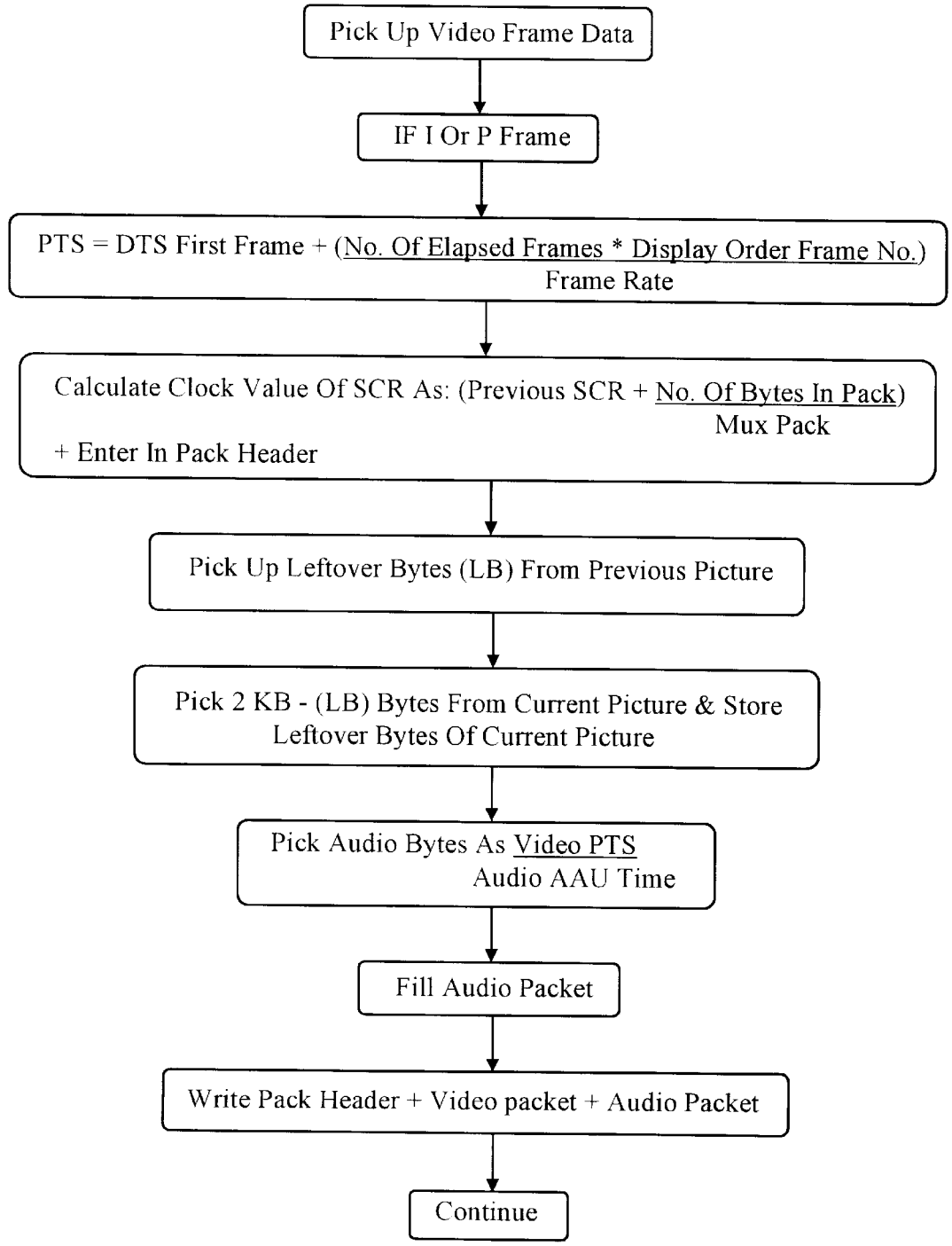
FIG. 11 is software flow diagram showing the replay/record operations of the VOW VCR of the client SUV, namely steps in the multiplexing of video and audio data into packets; the multiplexer adopts fixed video packet sizes and fills audio data for every frame of video that is packetized; every video and audio packet are packaged in a pack which contains the SCR (System Clock Reference) value.

FIG. 11 is flow diagram showing steps in the multiplexing of video and audio data into packets. The multiplexing operation adopts fixed video packet sizes and fills audio data for every frame of video that is packetized. Every video and audio packet and packaged in a pack which contains the SCR (System Clock Reference) value.

Figure 12:
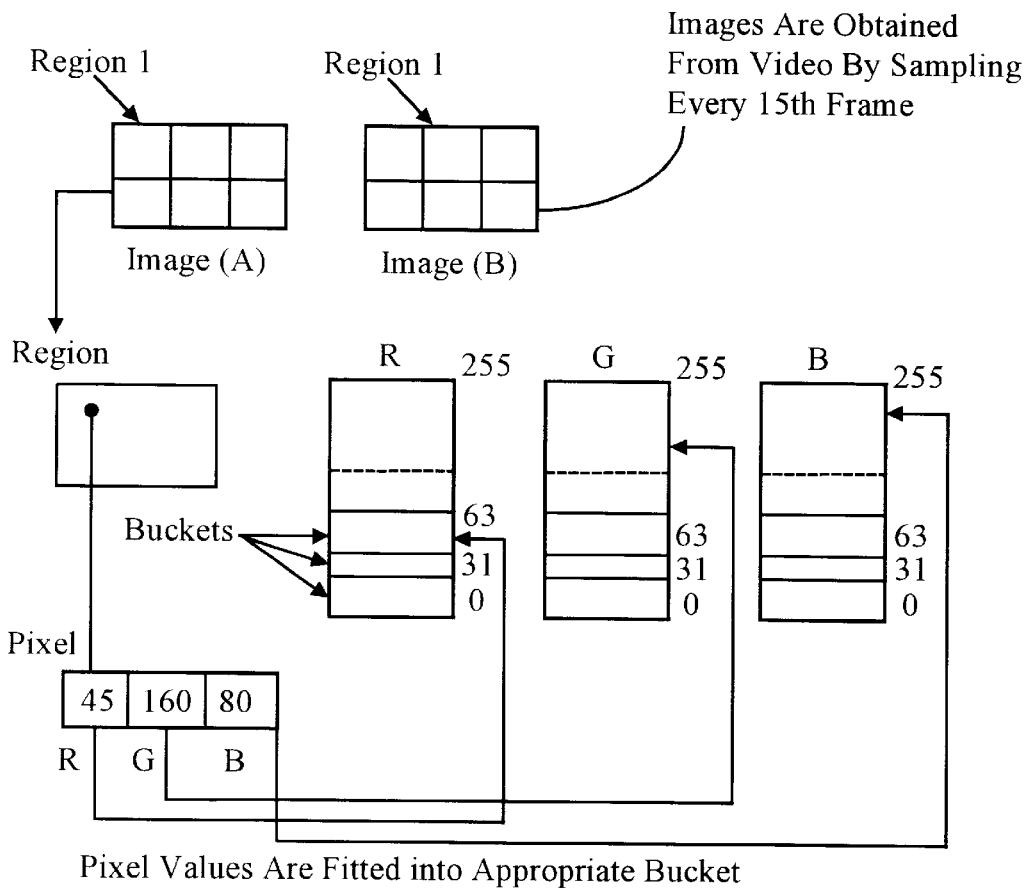
FIG. 12 is a diagrammatic illustration of the preferred process of detecting a scene change between two images, which scene change is obtained by sampling every 15th frame of video.
Figure 12:
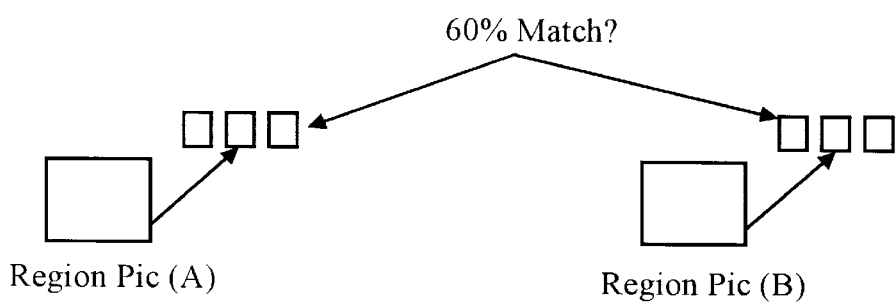

FIG. 12 diagrammatically shows the process of detecting a scene change between two images (obtained by sampling every 15th frame of video). The algorithm operates on the principle of taking fine grained color histograms on 6 regions of the two images. For the histogram, the entire color range is divided into 8 buckets and pixel values are filled in these buckets appropriately. When 60% of the values in the buckets match, it is considered to be a match. For two images, if there is a mismatch between 5 of 6 images, it is a scene change between the two images.

Figure 13:
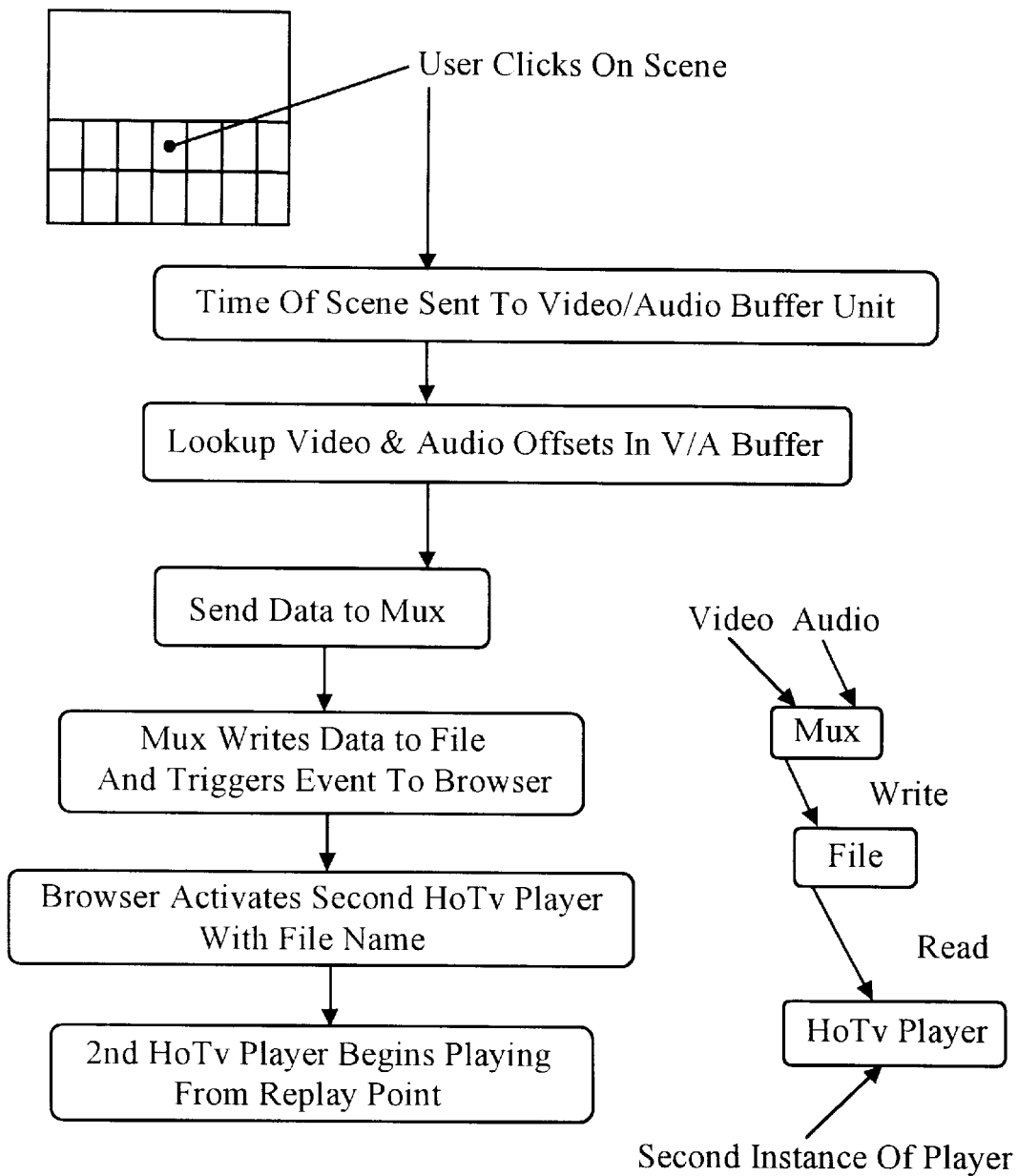
FIG. 13 is a software flow chart illustrating the replay and record operation.
Figure 14:
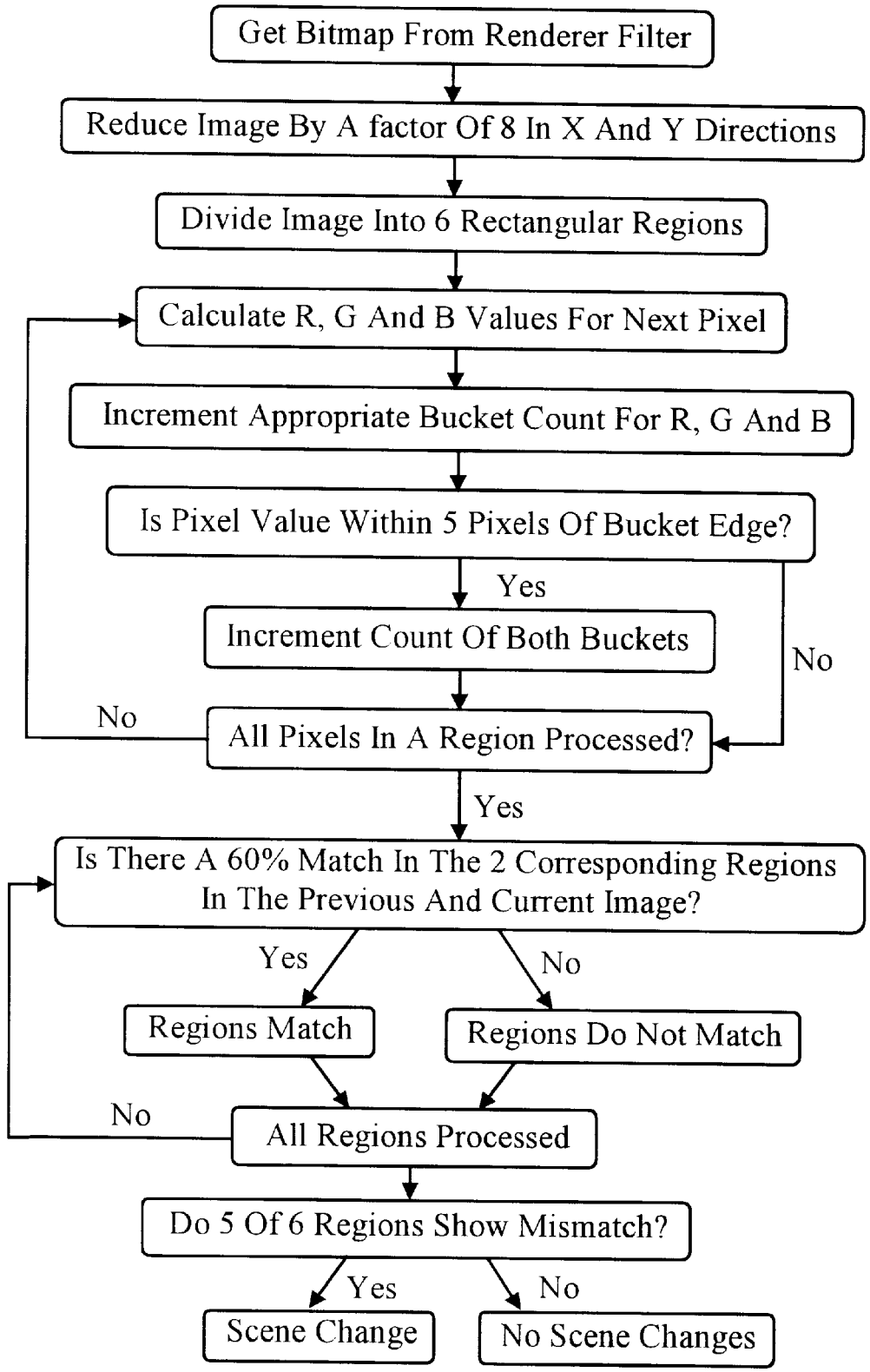
FIG. 14 is a software flow chart of the sequence of processing within the Client SUV's VOW VCR of the multiplexing of video and audio data onto a file such as is used for both replay and recording.

The software flow chart of FIG. 13 illustrates the replay and record operation and shows the actions that are taken. The replay operation is triggered when the user clicks on a scene. The time of the scene is sent to the video and audio buffer units which retrieve the correct video and audio frame and inform the multiplexer (process block) of this. The multiplexer begins grabbing the video and audio data and begins writing into a file opened in share mode. It also sends out an event to the browser informing it of the replay event. The browser executes a script to create a second instance of the VOW VCR player and this player begins playing the file and shows the replay.

FIG. 15 shows the basic structure of the video map file. Every GOP, or Group of Pictures comprising about half a second of video, begins with a table with three fields: 1) shape ID's, 2) corresponding links and 3) corresponding annotations. The shape ID's correspond to the different shapes that occur within the GOP. Each picture has a single three-field entry containing the shape ID, co-ordinates of the center of the shape and the co-ordinates of the shape itself. Hence the annotation and hyperlink information is retrieved using the shape ID from the table located at the beginning of the GOP.

3. Nature of the Compressed Files Played

Compression may be to any number of known video compression standards, and is typically to the MPEG standard. An compressed video file for playback, specified by a user, typically resides on a content server accessible over a network. These source streams are read, parsed and indexed based on structural elements of an the compressed video stream. For example, for an MPEG-compressed (hyper) video stream an "I2I" buffer is defined as one that contains all MPEG data for all video frames between and including two successive I frames. The MPEG parsing algorithm separates an MPEG system stream I2I buffer into video buffers, audio buffers and hypervideo buffers. The new video, audio and hypervideo buffers are again of I2I length; they contain data corresponding to the source I2I system buffer. Individual video and audio I2I buffers are stored in video and audio circular buffer queues. Indexing of video, audio and hypervideo I2I buffers is essential to provide direct access to MPEG elements for later modules.

For the example of MPEG compression, the Scene Change Detection module compares the two bounding I frames of a video I2I buffer to detect a scene transition. More generally, the Scene Change Detection module compares any two frames as are within a video buffer to detect a scene transition. (The buffer is then no longer an "I2I" buffer, but a "buffer containing representative (hyper)video frames".)

A detected scene change is represented by a keyframe (thumbnail image), which is a reduced image of the first frame in the scene. All keyframes appear below the playback window. The received video, which may contain hotspot information within, is decoded and played back. Information in the hypervideo "I2I" buffer (or equivalent, for other compression schemes) is decoded to retrieve hotspot shape and location. Hotspots are then painted over their corresponding video frames.

To record either stored or current playback video as an file, the multiplexer integrates video and audio tracks, available in separate buffer queues, taking care to maintain audio-video synchronization.

4. Playback Operation

To playback the compressed video stream, typically an MPEG stream, the user provides a stream name either as a Universal Resource Locator (URL) or as a directly accessible file. The stream is then opened for reading and the stream decoder is initialized for playback. Until the end of the stream, data is read in fixed block sizes for processing and subsequent playback.

Decoding, or decompressing, will be discussed, by way of example, for an MPEG-compressed stream. It will be understood that any compressed stream can, by definition, be decompressed—otherwise what good would it be? Processing of MPEG data involves parsing, indexing and scene change detection, and is performed for all frames between and including two consecutive I frames. This video-processing block is referred to as an "I2I" block. The stream parser examines each byte in an I2I block and separates the primary video elementary stream, the primary audio elementary stream, and the associated hypervideo information. Video and audio elementary stream portions for an I2I block are copied into video and audio buffer queues. Video and audio queues thus cache contiguous data extracted from multiple I2I blocks. However, at any point, only the latest I2I block for the incoming system stream and hypervideo information, is maintained. While pure video and audio queues are multiplexed for recording, system streams with overlaid hotspots are displayed and discarded.

While extracting video and audio elementary streams, video and audio index tables are concurrently populated. A video stream index table contains entries for every frame listing the frame type and the frame offset (in bytes) from start of video stream. An audio stream index table contains entries for every audio access unit (AAU) listing its offset (in bytes) from start of audio stream. The multiplexer uses video and audio indices to access any frame directly.

Bounding frames of an I2I block are compared for scene transitions. A scene transition is noted when the difference in feature vectors of the two frames exceeds a pre-set threshold. The later frame then represents the start of a new scene. A keyframe for the scene is generated by mathematically reducing its first frame. Keyframes, or thumbnail images, for all scenes appear in a storyboard below the playback window.

The decoder requests for a system stream portion corresponding to a fixed playback time interval. This data is supplied from the system stream "I2I" buffer (at least as the buffer is commonly so called for an MPEG-compressed stream). A rendering filter overlays hotspots for individual video frames before display. This filter is supplied with shapes and locations of all hotspots in a video frame. This hotspot data was extracted earlier as hypervideo information from the incoming system stream.

5. Record Operation

A user can initiate recording of incoming video either from current playback position or from scene transition detected earlier by the Scene Change Detection (SCD) engine. In the latter case, a click on a keyframe (a thumbnail image) will initiate recording from start of corresponding scene.

When recording from current playback position, the decoder provides the current video frame number. When recording from a scene transition, the SCD engine provides the starting video frame number. Given a starting frame number, the nearest, earlier Group of Pictures (GOP) boundary is computed. A Presentation Time Stamp (PTS), unique for every video frame, indicates its time of display. The PTS for the first recorded video frame, at a GOP boundary, is used to search for the corresponding Audio Access Unit in the Audio Buffer Queue. The Multiplexer generates an audio/video synchronized system stream starting at the latest GOP boundary prior (for, by way of example, and MPEG stream) to the specified record position.

User input indicates completion of a recording session. The decoder provides the current playback video frame number. For, by way of example, MPEG compression, the earliest GOP boundary after this current video frame is retrieved. Recording may continue till this GOP boundary, beyond the last specified frame. The last Audio Access Unit, corresponding to this GOP boundary, is established. Video and audio elementary streams are multiplexed till the established endpoints. The recorded stream is then closed.

Playback and Record operations of the system are explained by high-level flow charts below. Detailed flow charts for all important system processes are provided later in this document.

The Scene Change Detection algorithm is better explained with examples in the next following section titled Scene Change Detection.

6. Scene Change Detection

For the preferred, typical, MPEG encoding, the Scene Change Detection algorithm compares the images of two consecutive frames and determines whether the color content in these frames differ significantly to warrant reporting a scene transition at any frame between and including the two frames. The scene change detection algorithm is based on the color histogram comparison technique described below.

The color content of each pixel is defined by a combination of the weights of its three primary color components—Red, Green and Blue. Each of the three primary colors has multiple equal width color buckets as illustrated in the figure below. Comparing two regions of the two images involves separating all pixels in a region into different color buckets and then determining the difference in weights of the same color bucket for the two regions. A color bucket for a region matches the corresponding color bucket of the other region when the weight difference falls within a certain tolerance band.

A 24-bit color-coded pixel has 8 bits each for Red, Green and Blue color components. A primary color component weight can hence range from 0 to 255. A color bucket has a width of 30. Successive buckets hence cover the ranges: 0–30, 31–60, 61–90 . . . 211–240 and 241–255. Separation of pixels into color buckets can be explained by an example. Say a pixel is defined with Red=16, Green=52 and Blue=43. It would be classified as belonging to buckets R1, G2 and B2. Every pixel in a region is thus classified. As a special case, pixels that lie on bucket boundaries (±5) are included in both adjacent buckets. Hence a pixel defined with Red=25, Green=64 and Blue=14 would be classified as belonging to R1 and R2, G2 and G3, and to B1.

Pixel classification, as explained above, is carried out for the two regions under comparison. Weights of all buckets for a region are compared with their counterparts in the second region—Weight of bucket B1 for Region R11 is compared with weight of bucket B1 of Region R21, and so on. The percentage of total pixels included in a bucket indicates the weight of a bucket. For example, if 100 pixels from a total of 1000 pixels in region R11 were included in bucket B1 then the weight of bucket B1 for region R11 is (100/1000)=0.1. A match is reported when the weight of region-2 bucket is within 40% of the weight of the corresponding region-1 bucket. In our example, if weight of bucket B1 for region R21 were less than 0.06 or more than 0.14, then a mismatch between the two buckets (B1) would be reported.

All primary color buckets of a region are compared with buckets of the second region. Buckets, and by extension all pixels included in them, hence are reported to be matching or not matching. The number of pixels in a region reported as matching, as a percentage, is now calculated for each of the three colors individually. As an example, the number of pixels in Region R11 that are reported as matching, when considering only their Red color components is calculated. At least 60% of pixels need to match in order to report a match between the Red color components of two regions. Similarly the percentage of matching pixels, when Green and Blue color components are considered, is calculated. A 60% match in each color component is essential to report a complete region match. A region match is thus established.

The two images, and hence the frames that they represent, do not match only upon such times as at least 5 of the 6 constituent regions report a mismatch. An image mismatch is an indication of a scene transition at any frame between and including the two frames. A new scene is represented by the reduced, thumbnail-size, image of its first frame. The images is so reduced by simply undersampling the image pixels by a factor x in both the image x and y directions. For example, if x=2 then every second pixel will be selected in both the x and y image coordinates, and the reduced image will be 1.4 the sized of the original image.

Values of several parameters used in this algorithm can be configured to achieve varying results. The algorithm will report more scene transitions when the bucket-weight mismatch tolerance is reduced from the 40% value used above. Parameters that can be configured, and the typical values of these parameters, are as in the following table:

| Parameter Description | Typical Value |
|---|---|
| Number of regions into which an image is divided | 6 |
| Color component value range covered by each bucket | 30 |
| Bucket boundary width | +/−5 |
| Bucket weight mismatch tolerance | 40% |
| Required percentage of matching pixels to report a color component match | 60% |

-continued

| Parameter Description | Typical Value |
|---|---|
| Required number of mismatching regions to report a scene transition | 6 |

In accordance with the preceding explanation, variations and adaptations of the hypervideo player and recorder in accordance with the present invention will suggest themselves to a practitioner of the network communication system design arts.

In accordance with these and other possible variations and adaptations of the present invention, the scope of the invention should be determined in accordance with the following claims, only, and not solely in accordance with that embodiment within which the invention has been taught.

What is claimed is:

1. A method of displaying hyperlinks in streaming digital hypervideo;
   receiving streaming digital hypervideo containing both (i) hyperlinks and associated (ii) hotspot data;
   extracting hotspot data from hypervideo data that is within the received hypervideo; and
   displaying (i) the decompressed hypervideo with (ii) accompanying hotspots overlying in selected locations the displayed hypervideo in accordance with the extracted hotspot data;
   wherein the location of hyperlinks within the streaming digital hypervideo may be visually discerned by a viewer of the displaying as the selected locations of the associated hotspots.

2. The method of displaying hyperlinks according to claim 1 wherein the receiving is of streaming digital hypervideo across a digital communications network.

3. The method of displaying hyperlinks according to claim 1
   wherein the receiving is of compressed streaming digital hypervideo;
   and wherein the method further comprises:
   decompressing the received hypervideo;
   wherein the extracting of hotspot data is from the decompressed received hypervideo.

4. The method of displaying hyperlinks according to claim 1 wherein the displaying of the hypervideo with accompanying hotspots comprises:
   overlaying the hotspots for individual hypervideo frames, frame by frame, with a rendering filter in accordance with the hotspot data; and
   displaying the hypervideo frame with the overlaid hotspot.

5. The method of displaying hyperlinks according to claim 4 wherein the overlaying of the hotspots of the individual hypervideo frames is with a rendering filter supplied with (i) shapes and (ii) sizes of the hotspots in accordance with the hotspot data.

6. A system for displaying hyperlinks in streaming digital hypervideo;
   a receiver receiving compressed streaming digital hypervideo containing both (i) hyperlinks and associated (ii) hotspot data across a digital communications network;
   a computer
   decompressing the received hypervideo, and
   extracting hotspot data from the decompressed hypervideo; and a display displaying (i) the decompressed hypervideo with (ii) accompanying hotspots overlying in selected locations the displayed hypervideo in accordance with the extracted hotspot data;

wherein the location of hyperlinks within the streaming digital hypervideo may be discerned by a viewer of the display as the selected locations of the associated hotspots.

7. The system for displaying hyperlinks according to claim 6 further comprising:

a rendering filter overlaying the hotspots for individual hypervideo frames frame by frame in accordance with the extracted hotspot data;

wherein the display displays the hypervideo fame with the overlaid hotspot.

8. The method of displaying hyperlinks according to claim 7 wherein the rendering filter is supplied by the computer with (i) shapes and (ii) sizes of the hotspots in accordance with the extracted hotspot data.

9. A method of parsing and displaying streaming digital hypervideo so that not only may hyperlinks associated with selected frames of the hypervideo be transitorily seen by a subscriber/user/viewer during a video display as the selected frames are viewed, but so that, regardless that the streaming digital hypervideo unfolds in real time and the selected frames recede into the past, the hyperlinks may be seen and held available sufficiently long so as to reasonably be acted upon by the subscriber/user/viewer, the method comprising:

detecting as the streaming digital hypervideo unfolds scene changes in the streaming digital hypervideo;

generating a multiplicity of static keyframes each of which keyframes is indicative of the hypervideo that is within a corresponding one of a multiplicity of successive scenes of the hypervideo as the hypervideo unfolds, in each which keyframe any hyperlink of the hypervideo scene is preserved;

caching in a digital data cache recently unfolded digital hypervideo and any ones of the multiplicity of keyframes corresponding thereto;

displaying from the cache both (i) the streaming digital hypervideo where both the hypervideo and its display are innately transitory, and also (ii) those keyframes, part of the multiplicity ultimately generated, that are indicative of the streaming digital hypervideo most recently previously displayed;

wherein the displayed keyframes are not only static, but are not so quickly transitory as are the scenes of the streaming hypervideo with which the keyframes are associated, the static keyframes rather being displayed much longer than are the hypervideo scenes with which the keyframes are associated;

wherein a subscriber/user/viewer of the displaying may click through a hyperlink that is upon a displayed keyframe, and therein branch the receiving or the playing of digital hypervideo or both the receiving and the playing, even though the exact scene in which the hyperlink was present has already been displayed in real time and is now in the past;

wherein the subscriber/user/viewer need not pounce upon a hyperlink as it moves spatially rapidly or temporally transitorily, or both spatially rapidly and temporally transitorily, in the real time display of the received streaming digital hypervideo, but can click through upon a hyperlink within a longer-displayed static keyframe as and when desired.

10. The real-time method of parsing and displaying streaming digital hypervideo according to claim 9 wherein the receiving of streaming digital hypervideo is across a digital communications network.

11. The real-time method of parsing and displaying streaming digital hypervideo according to claim 9 wherein the receiving is of compressed streaming digital hypervideo;

and wherein the method further comprises before the generating:

decompressing the received compressed streaming digital hypervideo.

12. The real-time method of parsing and displaying streaming digital hypervideo according to claim 11 wherein the receiving is of MPEG-compressed streaming digital hypervideo.

13. The real-time method of parsing and displaying streaming digital hypervideo according to claim 11 wherein the detecting of scene changes is in respect of the bounding frames that are within the compressed streaming digital hypervideo.

14. The real-time method of parsing and displaying streaming digital hypervideo according to claim 9 wherein the generating is of a multiplicity of key frames each of which is a reduced image of a first frame that is within a corresponding multiplicity of successive scenes.

15. The real-time method of parsing and displaying streaming digital hypervideo according to claim 9 wherein the caching is of a predetermined number of keyframes and of the hypervideo corresponding thereto and associated therewith.

16. The real-time method of parsing and displaying streaming digital hypervideo according to claim 15 wherein the oldest cached keyframes are discarded in favor of newest cached keyframes in a first-in, first-out cache maintenance scheme.

17. The real-time method of parsing and displaying streaming digital hypervideo according to claim 15 wherein the caching is of from 3 to 42 keyframes.

18. The real-time method of parsing and displaying streaming digital hypervideo according to claim 9 wherein the displaying is of (i) the received streaming digital hypervideo substantially in normal time, proximately to (ii) the plurality of keyframes, in order to facilitate visual association between the (i) hypervideo and the (ii) keyframes by the subscriber/user/viewer.

19. A system for parsing and displaying streaming digital hypervideo so that not only may hyperlinks embedded therein be seen by a subscriber/user/viewer, but so that, regardless that the hypervideo unfolds in real time, the hyperlinks may be seen and held available sufficiently long so as to reasonably be acted upon by the subscriber/user/viewer, the system comprising:

a detector of scene changes occurring in the streaming digital hypervideo as the hypervideo unfolds;

a generator using the unfolding received streaming hypervideo and the detected scene changes to generate a multiplicity of keyframes each of which keyframes is associated with a corresponding one of a multiplicity of successive scenes as are defined by the detected scenes changes, in each which keyframe any hypervideo link of the associated hypervideo scene is preserved;

a digital data cache in which recent digital hypervideo and the keyframes corresponding thereto are cached; and a display, obtaining recent digital hypervideo and corresponding keyframes from the cache, displaying both (i)

the streaming digital hypervideo substantially in real time, and, in non-real time over a protracted period, (ii) a plurality of keyframes that are indicative of scenes of the streaming digital hypervideo most recently previously displayed;

wherein a subscriber/user/viewer of the display may click through a hyperlink that is upon a displayed keyframe, and therein branch the display even though the exact scene in which the hyperlink was present has already been displayed in normal time;

wherein the subscriber/user/viewer need not pounce upon a hyperlink as it moves spatially rapidly or temporally transitorily, or both spatially rapidly and temporally transitorily, within the streaming hypervideo during the real-time unfolding display of the streaming digital hypervideo, but can click through upon a hyperlink within a non-real-time protractedly displayed static keyframe as and when desired.

20. A method of parsing and displaying streaming digital hypervideo so that not only may hyperlinks embedded therein be transitorily seen by a subscriber/user/viewer during an unfolding video display, but so that, regardless that the hypervideo unfolds in real time, the hyperlinks may be seen and held available sufficiently long so as to reasonably be acted upon by the subscriber/user/viewer, the method comprising:

receiving streaming digital hypervideo in which hypervideo are contained marks defining scene changes in the streaming digital hypervideo;

generating from the received hypervideo and contained marks a multiplicity of keyframes each of which keyframes is indicative of the hypervideo that is within a corresponding one of a multiplicity of successive scenes as are defined by the scene change marks, in each which keyframe any hypervideo link of the hypervideo scene is preserved;

caching in a digital data cache recently received digital hypervideo and the multiplicity of keyframes corresponding thereto;

displaying both (i) the received streaming digital hypervideo substantially in real time, and, protractedly in non-real time, (ii) a plurality of keyframes, part of the multiplicity ultimately generated, that are indicative of the received streaming digital hypervideo most recently previously displayed;

wherein a subscriber/user/viewer of the displaying may click through a hyperlink that is upon a displayed keyframe, and therein branch the receiving or the playing of digital hypervideo or both the receiving and the playing, even though the exact scene in which the hyperlink was present has already been displayed in normal time;

wherein the subscriber/user/viewer need not pounce upon a hyperlink as it moves spatially rapidly or temporally transitorily, or both spatially rapidly and temporally transitorily, in the normal time display of the received streaming digital hypervideo, but can click through upon a hyperlink within a displayed keyframe as and when desired.

21. A computerized method of receiving and displaying streaming video data while caching, indexing and displaying thumb-nails of the same streaming video data to the purpose that a viewer of the streaming video data may arbitrarily regress and re-regress in time as desired, commencing and re-commencing and re-re-commencing the displaying of the video data from any arbitrary past time or times for howsoever many times as are desired, the infinitely flexible video instant replay method comprising:

receiving streaming digital video data over time;

first-displaying the received streaming digital video data substantially in real time;

detecting scene changes in the streaming digital video data;

caching in a digital data cache a multiplicity of scenes, as are defined by the detected scenes changes, of the received digital streaming video, oldest cached digital video scenes being discarded in favor of newest cached digital video scenes in a first-in, first-out cache maintenance scheme;

second-displaying as a multiplicity of still thumbnail images the multiplicity of scenes, oldest thumbnail images being discarded in favor of newest thumbnail images in a first-displayed, first-discarded scheme; and, in response to a viewer selection of some particular second-displayed thumbnail image, re-commencing the first-displaying from the time of this viewer-selected one of the multiplicity of thumbnail images;

wherein the viewer may arbitrarily regress and re-regress in time as desired, commencing and re-commencing and re-re-commencing the displaying of the digital streaming video data from any arbitrary past time or times for howsoever many times as are desired;

wherein the viewer is accorded infinitely flexible video instant replay.

22. A digital video data cache indexing and maintenance method in support of viewer-controlled instant video replay, the method comprising:

receiving digital streaming video data continuously over time substantially in real time;

first-displaying the received digital streaming video data substantially in real time as and when received;

detecting scenes transitions in the received digital streaming video data;

caching in a digital data cache a multiplicity of scenes, as are defined by the detected scenes transitions, of the received digital streaming video, oldest cached digital video scenes being discarded in favor of newest cached digital video scenes in a first-in, first-out cache maintenance scheme;

second-displaying as a multiplicity of still images the multiplicity of scenes, oldest images being discarded in favor of newest images in a first-displayed, first-discarded scheme; and, in response to a present selection of a viewer of some second-displayed scene image, re-initializing the first-displaying to commence from the time of this selected scene image, the receiving and the detecting and the caching continuing apace only that these operations will henceforth be dealing with digital video data that is in the future to that digital video data that is first-displayed.

23. A method of displaying and using digital streaming video data containing video hyperlinks, called interactive video, where, nonetheless to inexorable progress in displaying the video, the video hyperlinks are presented to a viewer user long enough, and slow enough, so that the user viewer can click on a hyperlink without tracking its occasionally rapid movement, and its occasionally transit appearance, on a display screen, the method of presenting streaming interactive video so that hyperlinks contained therein may reasonably be acted upon by mere humans comprising:

first-displaying streaming digital video data containing video hyperlinks, thus interactive video, substantially in real time;

detecting scenes transitions in the digital streaming video data;

caching in a digital data cache a multiplicity of scenes, as are defined by the detected scenes transitions, of the received digital streaming video, the hyperlinks being preserved in the cache;

second-displaying as a multiplicity of still images the multiplicity of scenes, oldest images being discarded in favor of newest images in a first-displayed, first-discarded scheme; and, responding to a click on hyperlink in a still image by a user viewer to branch the first-displaying identically that this first displaying would have been branched should the subscriber/user/viewer have been so fast, and so nimble, so as to click on the same video hyperlink in the first-displayed image;

wherein the subscriber/user/viewer is accorded a reasonable time to think and to act in clicking on hyperlinks in the second display, and need not remain poised to spring upon a hyperlink during its potentially rapidly moving, and its potentially transitory, first display.

* * * * *